United States Patent
Hamamura et al.

(10) Patent No.: US 8,102,894 B2
(45) Date of Patent: *Jan. 24, 2012

(54) COMMUNICATION SYSTEM AND ITS METHOD

(75) Inventors: Masanori Hamamura, Kochi (JP); Kazuki Chiba, Kochi (JP)

(73) Assignee: Kochi University of Technology, Kami, Kochi (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/665,322

(22) PCT Filed: Jul. 15, 2008

(86) PCT No.: PCT/JP2008/062753
§ 371 (c)(1),
(2), (4) Date: Mar. 25, 2010

(87) PCT Pub. No.: WO2009/081606
PCT Pub. Date: Jul. 2, 2009

(65) Prior Publication Data
US 2010/0183048 A1 Jul. 22, 2010

(30) Foreign Application Priority Data
Dec. 25, 2007 (JP) ................................. 2007-341948

(51) Int. Cl.
*H04B 1/00* (2006.01)
(52) U.S. Cl. ........ 375/132; 375/135; 375/136; 375/140; 375/146; 375/147; 375/143; 375/142; 375/150; 375/144
(58) Field of Classification Search .................. 375/132, 375/135, 136, 140, 146, 147, 143, 142, 150, 375/144
See application file for complete search history.

(56) References Cited

U.S. PATENT DOCUMENTS

| | | | |
|---|---|---|---|
| 6,580,748 B1 * | 6/2003 | Muraoka | 375/141 |
| 6,937,558 B2 * | 8/2005 | Wakutsu | 370/208 |
| 7,620,099 B2 * | 11/2009 | Hahm et al. | 375/150 |

FOREIGN PATENT DOCUMENTS

| | | |
|---|---|---|
| JP | 09-298495 | 11/1997 |
| JP | 2003-032220 | 1/2003 |

(Continued)

OTHER PUBLICATIONS

Chiba, K. et al., "Performance of Multitone Hopping CDMA Using Feedback-Controlled Hopping Pattern Over Multipath Channel," *The Institute of Electronics, Information and Communication Engineers, Technical Report of IEICE*, vol. 107, No. 395, Dec. 11, 2007, pp. 1-6 (with English abstract).

(Continued)

*Primary Examiner* — Kabir A Timory
(74) *Attorney, Agent, or Firm* — Foley & Lardner LLP

(57) ABSTRACT

In a communication system including a plurality of pairs of a transmitting device 2 and a receiving device 3, the transmission performance in the pairs is to be improved. The transmitting device 2-$k$ transmits a transmission signal $s_k(t)$ to the receiving device 3-$k$ a plurality of number of times. The receiving device 3-$k$ updates the weight matrix $W_k$ and the hopping pattern $P_k$ used by the FIR filter which performs filtering on the transmission signal $r_k(t)$ at a predetermined time interval. The receiving device 3-$k$ transmits the updated hopping pattern $P_k$ to the transmitting device 2-$k$. The transmitting device 2-$k$ receives the hopping pattern $P_k$ to be used for subsequent spread spectrum.

21 Claims, 14 Drawing Sheets

FOREIGN PATENT DOCUMENTS

JP    2006-148220    6/2006

OTHER PUBLICATIONS

Einarsson, G., "Address assignment for a time-frequency-coded, spread-spectrum system," *Bell Syst. Tech. J.*, vol. 59, No. 7, Sep. 1980 (Abstract only).

Miyatake, T. et al., "Asynchronous Decentralized DS-CDMA using Feedback-Control Spreading Sequences for Time-Dispersive Channels," *IEICE Trans. Commun.*, vol. E91-B, No. 1, Jan. 2008, pp. 53-61.

Ulukus, S. et al., "Iterative Construction of Optimum Signature Sequence Sets in Synchronous CDMA Systems," *IEEE Trans. Inform. Theory*, vol. 47, No. 5, Jul. 2001, pp. 1989-1998.

Notice of Reasons for Rejection for JP 2009-541653 mailed Jul. 5, 2010 (with English translation).

Office Action for JP 2010-042252 mailed Apr. 7, 2010 (with English translation).

US Office Action on U.S. Appl. No. 12/770,281 mailed Feb. 15, 2011.

US Notice of Allowance on U.S. Appl. No. 12/770,281 mailed Apr. 28, 2011.

Notice of Allowance for U.S. Appl. No. 12/770,281, mailed on Oct. 17, 2011, 8 pp.

\* cited by examiner

COMMUNICATION SYSTEM 1

HARDWARE CONFIGURATION FOR TX2 AND RX3

TRANSMITTING PROCESS 22

POWER SPECTRA OF INITIAL HOPPING PATTERN

INITIAL HOPPING PATTERN

POWER SPECTRA OF UPDATED HOPPING PATTERN

UPDATED HOPPING PATTERN

US 8,102,894 B2

COMMUNICATION SYSTEM AND ITS METHOD

CROSS-REFERENCE TO RELATED APPLICATIONS

The present application is a U.S. national stage application claiming the benefit of International Application No. PCT/JP2008/062753, filed on Jul. 15, 2008, which claims the benefit of Japanese Application No. 2007-341948, filed on Dec. 25, 2007, the entire contents of which are incorporated herein by reference in their entireties.

TECHNICAL FIELD

The present invention relates to a communication system and its method for transmitting data in a spread spectrum system using frequency hopping.

BACKGROUND ART

For example, Non-Patent Document 1 discloses a communication system configured such that any two communication devices are taken from a large number of communication devices to make a plurality of pairs of communication devices, each pair capable of transmitting data in an asynchronous DS-CDMA (Direct-Sequence Code Division Multiple Access) system.

Non-Patent Document 2 discloses a communication system where a receiving device feeds back a hopping pattern to a transmitting device.

Non-Patent Document 3 discloses an initial value of the hopping pattern P.

[Non-Patent Document 1]: Asynchronous Decentralized DS-CDMA Using Feedback-Control Spreading Sequences for Time-Dispersive Channels, (Kazuki CHIBA, Masanori HAMAMURA and Shin'ichi TACHIKAWA, IEICE TRANS COMMUN, VOL. E91-µ, NO1. JANUARY 2008, PAPER, Special Section on Cognitive Radio and Spectrum Sharing Technology, The Institute of Electronics, Information and Communication Engineers)

[Non-Patent Document 2]: Interactive constructions of optimum signature sequence sets in synchronous CDMA systems, (S. Ulukus et. al., IEEE Trans. Inform., Theory, vol. 47, no. 5, pp. 1989-1998, July 2001)

[Non-Patent Document 3]: Address assignment for a time-frequency-coded spread-spectrum system (G. Einarson, Bell Syst. Tech. J., vol. 59, no. 7, pp. 1241-1255, September 1980)

DISCLOSURE OF THE INVENTION

Problems to be Solved by the Invention

Against the above background, the communication system and its method according to the present application has been made, and one of the embodiments is a communication system (1) including a plurality of pairs of a transmitting device (2) and a receiving device (3), wherein in each of the pairs, the transmitting device has signal transmission units (222, 224, 226, and 244) which, based on a spread pattern (hopping pattern $P_k$) which includes a plurality of first elements (weights) defined with respect to components of a predetermined first number (M) of first domains (frequency domains) and components of a predetermined second number (L) of second domains (time domains) and spreads transmission data (message symbol $b_k$) to the components of the first domains and the components of the second domains, sequentially spreads the transmission data to the components of the first domains and the components of the second domains every predetermined time interval ($T_c$, and $T_s$) and transmits the transmission data as a transmission signal ($s_k$); and update units (240 and 242) which, based on the spread pattern received from the receiving device, update the spread pattern used to spread the transmission data; and the receiving device has receiving units (208, 210, 212) which receive the transmission signal; expansion units (400, 402, 404, 424, and 440) which sequentially expand the received transmission signal ($s'_k$) into a plurality of second elements defined with respect to components of the first domains whose number is equal to or greater than the first number and components of the second domains whose number is a third number ($L+\alpha$) which is greater than the second number at each of the time intervals; processing units (410, 414, 428, 442, 444) which sequentially perform a process using a plurality of first coefficients defined for each of the second elements on the second elements obtained as a result of the expansion at each of the time intervals; a generation unit (344) which generates the spread pattern using the processed second elements and a plurality of second coefficients constituting a part of the first coefficients; and a pattern transmission unit (346) which transmits the generated spread pattern to the transmitting device.

It should be noted that the above description contains reference numerals to clarity the correspondence between the present specification and the accompanying drawings, which is not intended to limit the technical scope of the present invention.

SUMMARY

An embodiment of the communication system according to the present invention includes a large number of communication devices and uses any plurality of pairs of the communication devices (e.g., a pair of two communication devices) to transmit a transmission signal obtained by spreading transmission data based on a hopping pattern represented in a matrix form, at the same time in parallel between the pairs of communication devices.

The plurality of pairs of communication devices can share the same path with each other. Thus, a pair of communication devices receives a transmission signal from another pair of communication devices, which decreases the transmission quality of the transmission signal in the pair communication devices.

In a pair of communication devices, one communication device (transmitting device) mainly transmits a transmission signal and the other communication device (receiving device) receives the transmission signal. It should be noted that the transmitting device and the receiving device may be of a completely different configuration or of the same configuration.

The receiving device receives a transmission signal, expands the received transmission signal into a matrix of components of a frequency domain and components of a time domain, multiplies each of the expanded matrix elements by a coefficient (first coefficient) for filtering, adds them in a row direction and in a column direction, and then outputs them as the filtering results.

The first coefficient uses the first coefficient as an element and can be expressed in a matrix larger in the row direction and in the column direction or in any one of the directions than that of the frequency hopping pattern.

The receiving device uses the above filtering results to update the matrix of the first coefficients so as to improve the quality of the transmission data decoded from the transmission signal.

Further, the receiving device extracts the second coefficients corresponding to the hopping pattern from the updated matrix of the first coefficients and transmits them to the transmitting device.

The transmitting device uses a new hopping pattern transmitted from the receiving device, generates a transmission signal with a transmission performance better than that before the new hopping pattern is used, and transmits the signal to the receiving device.

Thus, while transmission and feedback of transmission signals are repeated between the transmitting device and the receiving device belonging to the same pair of communication devices, the signal transmission performance therebetween is gradually improved.

The technical advantages of the present invention and other technical advantages should be readily apparent to those skilled in the art by reading the detailed description of the embodiments illustrated in the accompanying drawings.

The accompanying drawings are incorporated in the present specification to constitute a part thereof, illustrate embodiments of the present invention, and serve to explain the embodiments as well as the principle of the present invention.

The drawings referred to in the present specification should not be understood to be drawn in a certain scale unless otherwise noted.

BRIEF DESCRIPTION OF THE DRAWINGS

The embodiments of the present invention should be most readily understood by referring to the following description as well as the accompanying drawings regarding the configuration and the operation thereof.

FIG. 9 illustrates a communication sequence diagram illustrating data transmission and feedback (S10) of the hopping pattern $P_k$ between the transmitting device and the receiving device illustrated in FIG. 1 and the like;

BEST MODE FOR CARRYING OUT THE INVENTION

Hereinafter, embodiments of the present invention will be described in detail.

The embodiments of the present invention are illustrated in the accompanying drawings.

The present invention is described in connection with the embodiments, but it should be understood by those skilled in the art that the description herein of specific embodiments is not intended to limit the invention to the particular forms disclosed.

On the contrary, the present invention is intended to cover the explicit spirit as defined by the appended claims as well as all alternatives, modifications, and equivalents falling within the scope of the invention as defined by the appended claims.

Moreover, the present invention is described specifically as well as in detail to the level that those skilled in the art can sufficiently understand the appended claims.

However, as will be apparent to those skilled in the art, the present invention may be made without following all the descriptions described specifically as well as in detail herein.

It should be noted that known methods, procedures, components, and circuits may not be described in detail for a simplified description of the embodiments of the present invention.

However, it should be noted that these terms and other similar terms should each be associated with an appropriate physical quantity and thus should be understood as a convenient label assigned to the corresponding quantity.

As will be apparent from the above discussion that unless otherwise noted, throughout the present invention, the description containing the terms such as "spread" and "transmit" should be understood to mean an operation and a process executed by a specific use of a computer hardware resource or a dedicated hardware resource.

[Communication System 1]

First, a communication system 1 according to an embodiment of the present invention will be described.

Figure 1:
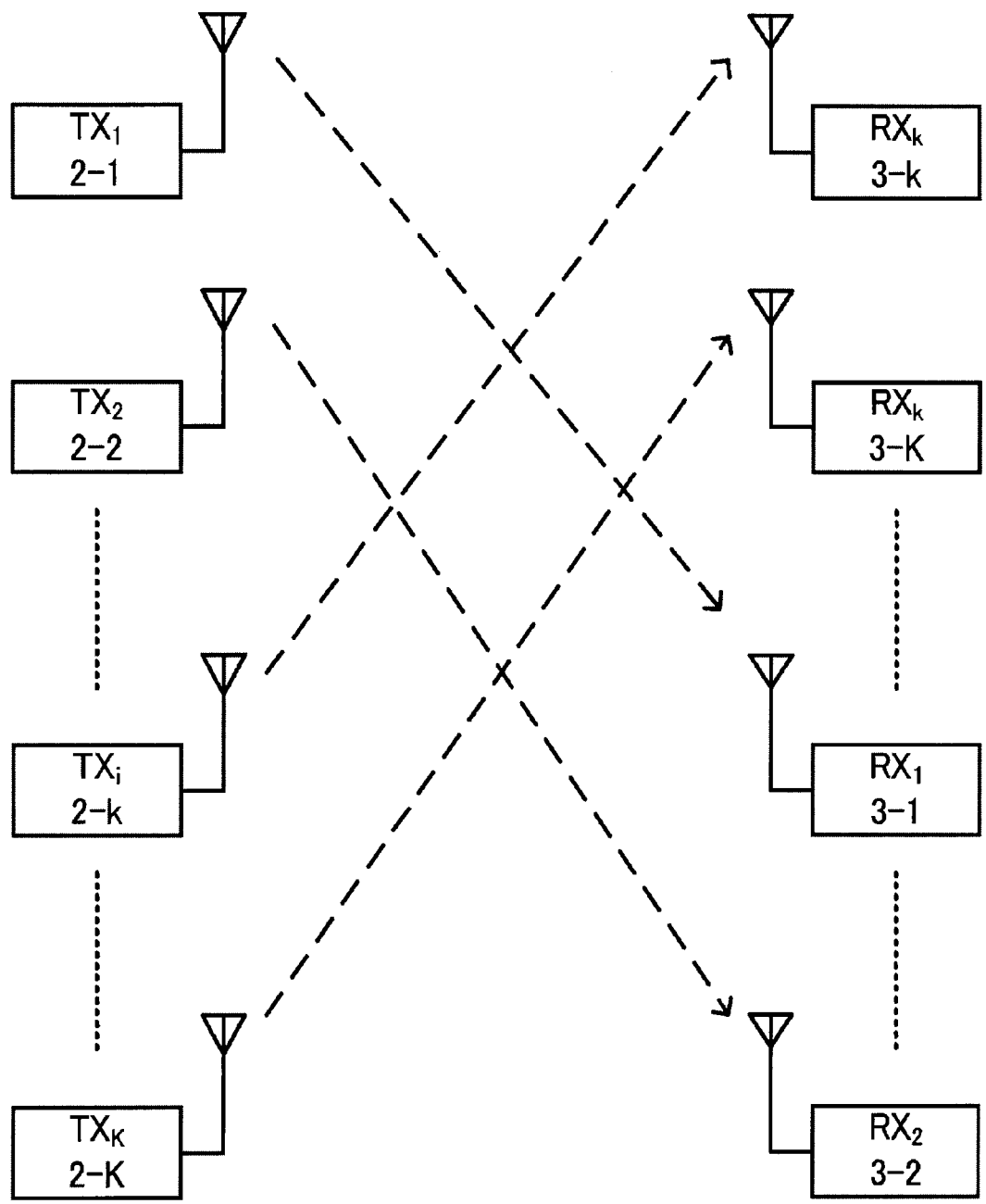
FIG. 1 illustrates a communication system according to an embodiment of the present invention.

FIG. 1 illustrates the communication system 1 according to an embodiment of the present invention.

As illustrated in FIG. 1, the communication system 1 includes a K (two or more integer) number of transmitting devices (TX) 2-1 to 2-K and a K number of receiving devices (RX) 3-1 to 3-K each of which is fixed or semifixed in one place or mobile.

In the following description, when any one of the plurality of components such as transmitting devices 2-1 to 2-K is specified without identifying a specific one, the one may be written simply as the transmitting device 2 for simplicity.

Hereinafter, the same reference numeral or reference character denotes substantially the same component throughout the figures.

Note that the transmitting device 2 and the receiving device 3 may be of the same configuration, but are distinguished from each other in the following description for the purpose of substantiating and clarifying the description.

As described above, the communication system 1 is configured such that one transmitting device 2 may transmit a transmission signal to a plurality of receiving devices 3, a plurality of transmitting devices 2 may each transmit a transmission signal to one receiving device 3, and a plurality of transmitting devices 2 may each transmit a transmission signal to a plurality of receiving devices 3.

However, in the following description, for the purpose of substantiating and clarifying the description, the communication system 1 is configured as a specific example such that one transmitting device 2-$k$ (K≧k≧1) and one receiving device 3-$k$ are paired and a transmission signal is transmitted only between the transmitting device 2-$k$ and the receiving device 3-$k$ included in each of the plurality of pairs; and based on a frequency hopping pattern, spread spectrum is performed on the transmission signal $s_k(t)$ expressed in the low-pass equivalent.

Figure 2:
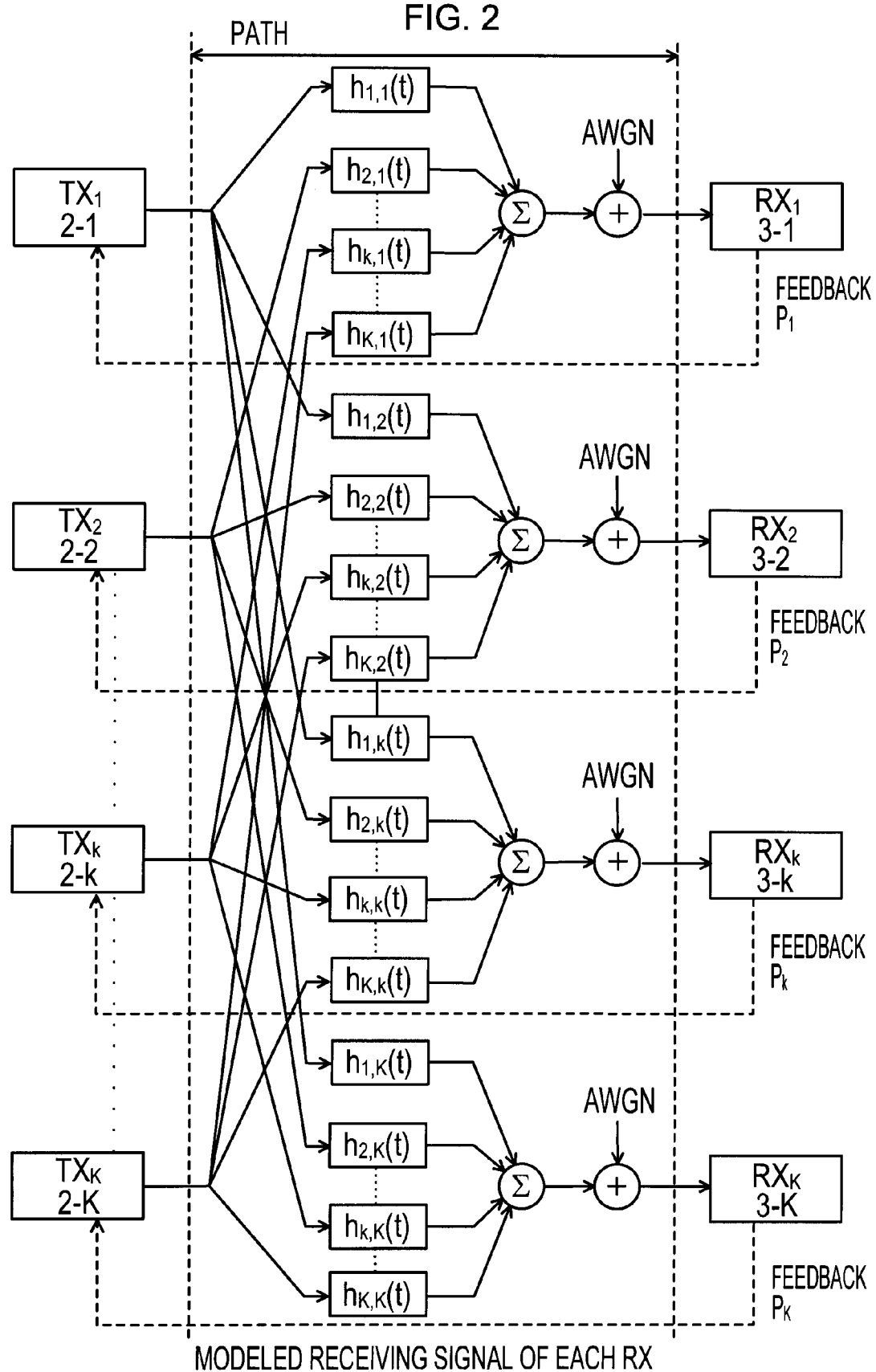
FIG. 2 illustrates modeled transmission signals s'k(t) received by a receiving device of the communication system illustrated in FIG. 1 and a hopping pattern fed back from the receiving device to a transmitting device.

FIG. 2 illustrates modeled transmission signals $s'_k(t)$ received by the receiving device 3-$k$ of the communication system 1 illustrated in FIG. 1 and the hopping pattern fed back from the receiving device 3-$k$ to the transmitting device 2-$k$.

The communication system 1 allows a path to be shared by not only a pair of the transmitting device 2-$k$ and the receiving device 3-$k$ but also other pairs.

In this case, as illustrated in FIG. 2, the receiving device 3-$k$ receives not only the transmission signal $s_k(t)$ from the transmitting device 2-$k$ included in the same pair but also transmission signals $s'_k(t)$ including the transmission signals from the transmitting devices 2-1 to 2-($k$−1) and 2-($k$+1) to 2-K included in other pairs.

In other words, the communication system 1 allows the receiving device 3-$k$ to be constantly susceptible to interference from each of the transmitting devices 2-$k'$ belonging to other pairs.

Even in such a circumstance, the receiving device 3-$k$ of the communication system 1 sequentially updates a weight matrix ($W_k$) expressed in complex weights $w_{k,\ m,\ l}$ (M≧m≧1 and L+α≧l≧1, where α is an integer equal to or greater than 0 and l is a process for each chip time length $T_c$) used for filtering so as to improve receiving performance of the transmission signal $s_k(t)$ received from the transmitting device 2-$k$ belonging the same pair.

Further, the receiving device 3-$k$ feeds back a part of the elements of the updated weight matrix ($W_k$) to the transmitting device 2-$k$ as a hopping pattern $P_k$ and causes the transmitting device 2-$k$ to update the hopping pattern used for spectrum spreading so that the transmission signal $s_k(t)$ itself can be subject to spectrum spreading using a pattern suitable for passing through the path illustrated in FIG. 2.

[Hardware Configuration]

Figure 3:
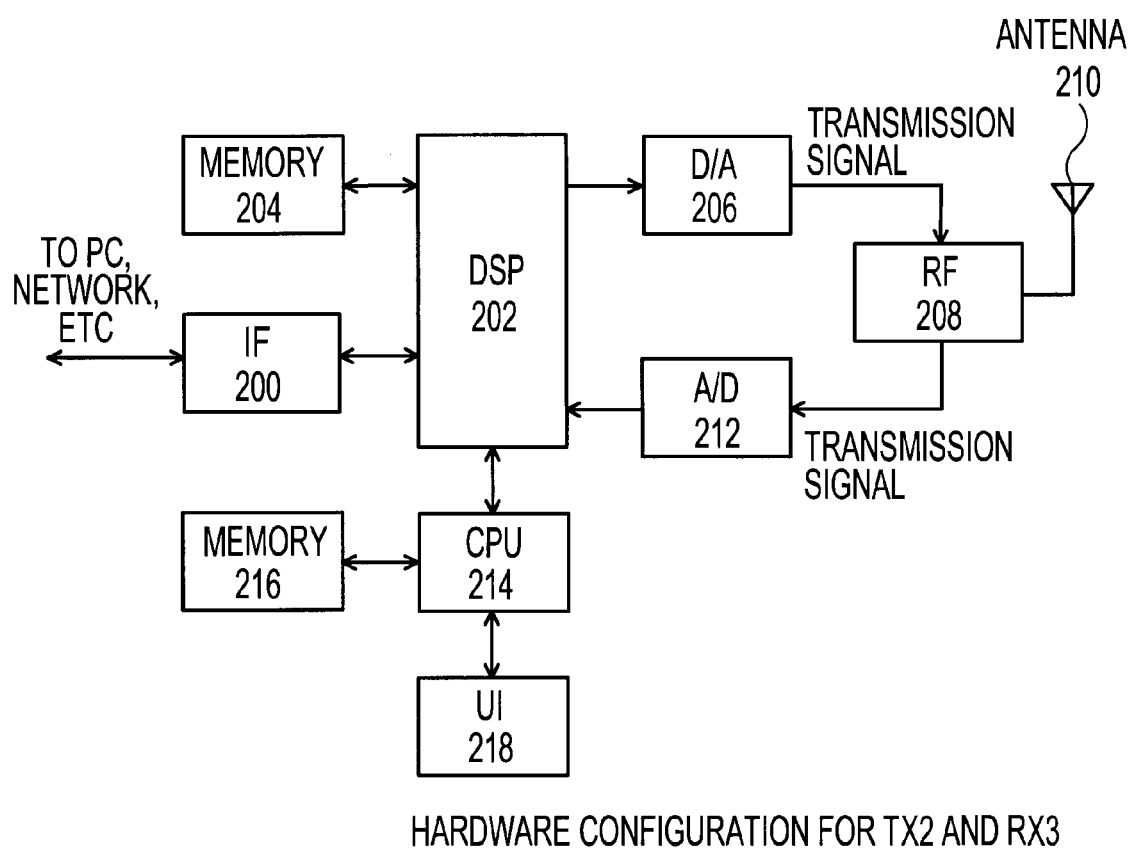
FIG. 3 illustrates a hardware configuration of the transmitting device and the receiving device illustrated in FIG. 1.

FIG. 3 illustrates a hardware configuration of the transmitting device 2 and the receiving device 3 illustrated in FIG. 1.

As illustrated in FIG. 3, the transmitting device 2 and the receiving device 3 are used by being connected to a computer (PC) or a network (not illustrated) such as a LAN where a message symbol (transmission data) $b_k$ (n: n denotes the sequence of message symbols) in a QPSK (quadrature phase-shift keying) system is outputted to the transmitting device 2 or the message symbol $b_k(n)$ is inputted from the receiving device 3.

The transmitting device 2 and the receiving device 3 include an interface (IF) circuit 200, a digital signal processor (DSP) 202, a memory 204 for the DSP 202, a digital/analog (D/A) converter 206, a radio frequency (RF) circuit 208, an antenna 210, an analog/digital (A/D) converter 212, a CPU 214, and a memory 216 for the CPU 214, and a user interface (UI) device 218 interfacing between the transmitting device 2 or the receiving device 3 and the user.

The transmitting device 2 and the receiving device 3 include a component such as a cell phone configured to be able to transmit voice and data in the CDMA system or a radio LAN device serving as a computer allowing software to perform signal processing, radio communication and information processing.

Note that in the following description, for the purpose of substantiating and clarifying the description, it is assumed as a specify example that the transmitting device 2 and the receiving device 3 allow software to perform signal processing and information processing.

However, the transmitting device 2 and the receiving device 3 may be configured to allow embedded hardware to perform signal processing and information processing depending on the configuration, application, and performance requirement thereof.

Moreover, the transmitting device 2 and the receiving device 3 do not necessarily use both the DSP 202 and the CPU 214, but may use either any one depending on the configuration, application, and performance requirement thereof.

In the transmitting device 2-$k$ and the receiving device 3-$k$, the IF 200 provides a function to input and output the message symbol $b_k(n)$ between the computer or the network and the transmitting device 2 and the receiving device 3.

The DSP 202 executes a signal processing program stored in the memory 204 to perform spread spectrum on a message symbol $b_k(n)$ inputted from the IF 200 or a message symbol $b_k(n)$ generated from the voice inputted through a microphone (not illustrated) of the UI 218, and outputs it to the D/A 206.

The D/A 206 converts the digital message symbol $b_k(n)$ undergoing spread spectrum to an analog baseband or a transmission signal $s_k(t)$ with an intermediate frequency of the frequency which can be processed by the DSP 202 or the CPU 214, and outputs it to the RF 208.

The RF 208 converts the transmission signal $s_k(t)$ to a transmission signal $s_k(t)$ of a frequency used for signal transmission between the transmitting device 2 and the receiving device 3 and transmits the signal to the path through the antenna 210.

Then, the RF 208 receives the transmission signal $s_k(t)$ from the transmitting device 2 or the receiving device 3 of the communication party, converts the signal to a transmission signal $s_k(t)$ of a baseband or an intermediate frequency, and outputs the signal to the A/D 212.

The A/D 212 converts the analog transmission signal $s_k(t)$ to a digital transmission signal $s_k(t)$ and outputs the signal to the DSP 202.

The CPU 214 executes a program stored in the memory 216 to control the operation of the transmitting device 2 and the receiving device 3, for example, according to the user operation to the UI 218.

In addition, the CPU 214 performs processes of setting and updating the weight used for filtering the transmission signal $s_k(t)$ received by the DSP 202.

Moreover, the CPU 214 controls the UI 218 to present the user with information and the like.

[Software Configuration]

Figure 4:
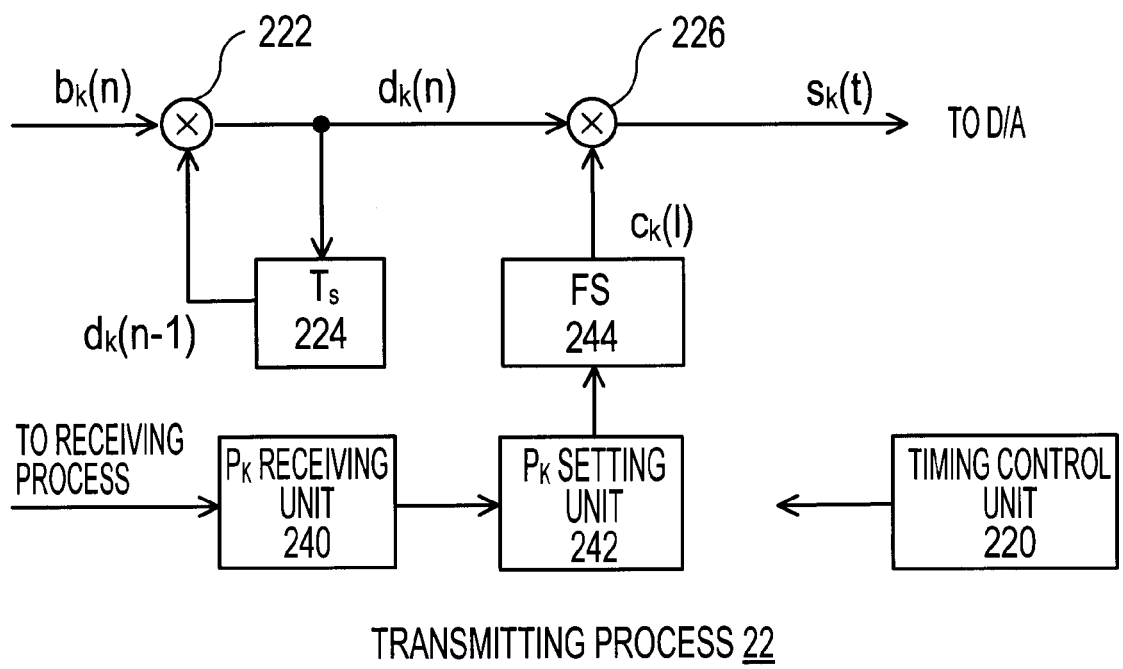
FIG. 4 illustrates a configuration of a transmitting program executed by the transmitting device and the receiving device illustrated in FIG. 1.

FIG. 4 illustrates a configuration of a transmitting program 20 executed by the transmitting device 2-$k$ and the receiving device 3-$k$ illustrated in FIG. 1.

Figure 5:
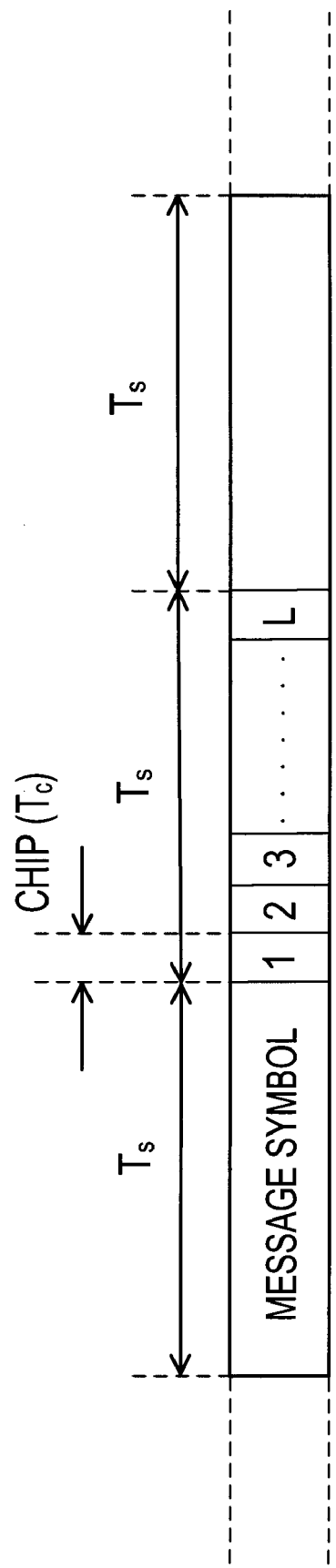
FIG. 5 illustrates a configuration of a symbol and a chip used by the transmitting device and the receiving device.

FIG. 5 illustrates a configuration of a symbol and a chip used by the transmitting device 2 and the receiving device 3.

As illustrated in FIG. 4, the transmitting program 22 includes a timing control unit 220, first and second multiplication units 222 and 226, a delay unit 224, a hopping pattern ($P_k$) receiving unit 240, a hopping pattern setting unit 242 and a frequency synthesizer (FS) unit 244.

The transmitting program 20 is supplied to the transmitting device 2 and the receiving device 3, for example, via a storage medium or the network; is loaded in the memory 204 for the DSP or loaded in the memory 216 for the CPU illustrated in FIG. 3; and is executed by specifically using a hardware resource of the transmitting device 2 and the receiving device 3 under an OS such as ITRON executed by the DSP 202 or the CPU 214 (the same is applied to the each of the following programs).

The transmitting program 22 uses the above units to perform spread spectrum on the message symbol $b_k(n)$ inputted through the network or the like according to the hopping pattern to generate the transmission signal $s_k(t)$ and outputs the signal to the D/A 206.

In the transmitting program 22 executed by the transmitting device 2-$k$, the timing control unit 220 controls the timing of the operation of each component of the transmitting program 22 so as to be synchronized with the message symbol $b_k(n)$ and the chip illustrated in FIG. 5.

The delay unit 224 gives a delay $T_s$ of one message symbol to the multiplication result $d_k(n-1)$ of an (n-1)-th message symbol $b_k(n-1)$ outputted from the first multiplication unit 222.

When an n-th message symbol $b_k(n)$ is inputted to the first multiplication unit 222, the delay unit 224 outputs the delayed multiplication result to the first multiplication unit 222 as delay data $d_k(n-1)$.

The first multiplication unit 222 multiplies the inputted n-th message symbol $b_k(n)$ by the delay data $d_k(n-1)$ inputted from the delay unit 224 and outputs the multiplication result $d_k(n)$ to the delay unit 224 and the second multiplication unit 226.

Note that as discussed later as the performance evaluation of the communication system 1, the weight adjustment (training) of the filter unit 4 is performed using known data (pilot) preliminarily stored in the transmitting device 2 and the filter unit 4, the above described process (differential encoding) by the delay unit 224 and the first multiplication unit 222 is not required.

In this case, the transmitting device 2 outputs the message symbol $b_k(n)$ itself to the multiplication unit 226 as the multiplication result $d_k(n)$.

The hopping pattern receiving unit 240 receives a hopping pattern $P_k$ used for spread spectrum of the message symbol $b_k(n)$ by frequency hopping (FH) from the receiving device 3 via the antenna 210, the RF 208, the A/D 212, and the receiving program 30 (described later by referring to FIGS. 6 to 8) executed by the transmitting device 2-$k$, and outputs it to the hopping pattern receiving unit 240.

The hopping pattern $P_k$ can be expressed in an M×L matrix as shown in the following expression 1, where the column component includes the number of components corresponding to the code length L (an L number of components of the time domain; L denotes an integer of 2 or more) per chip and the row component includes the M number (M denotes an integer of 2 or more) of elements of the frequency domain contained in a signature wave signal $c_k(t)$ generated by the frequency synthesizer unit 244.

[Expression 1]

$$P_k = \begin{bmatrix} p_{k,1,1} & p_{k,1,2} & \cdots & p_{k,1,M} \\ p_{k,2,1} & p_{k,2,2} & \cdots & p_{k,2,M} \\ \vdots & \vdots & \ddots & \vdots \\ p_{k,L,1} & p_{k,L,2} & \cdots & p_{k,L,M} \end{bmatrix} \quad (1)$$

The hopping pattern setting unit 242 replaces an old hopping pattern $P_k$ which has been used so far with a new hopping pattern $P_k$ inputted from the hopping pattern receiving unit 240 to update the hopping pattern.

In addition, the hopping pattern setting unit 242 outputs the updated hopping pattern $P_k$ to the frequency synthesizer unit 244.

The frequency synthesizer unit 244 generates a signature wave signal $c_k(t)$ of a frequency based on the hopping pattern $P_k$ inputted from the hopping pattern setting unit 242 and outputs the signal to the second multiplication unit 226.

The second multiplication unit 226 operates as a quadrature modulator, performs complex multiplication on the multiplication result $b_k(n)$ inputted from the first multiplication unit 222 and the signature wave signal $c_k(t)$ for spreading spectrum and outputs the signal to the D/A 206 (FIG. 3) as digital data indicating the transmission signal $s_k(t)$.

The D/A 206 converts the digital data indicating the transmission signal $s_k(t)$ to an analog transmission signal $s_k(t)$, which is converted to a frequency used for transmission between the transmitting device 2 and the receiving device 3 by the RF 208. Then, the frequency undergoes power amplification before being transmitted to each communication party through the antenna 210.

Figure 6:
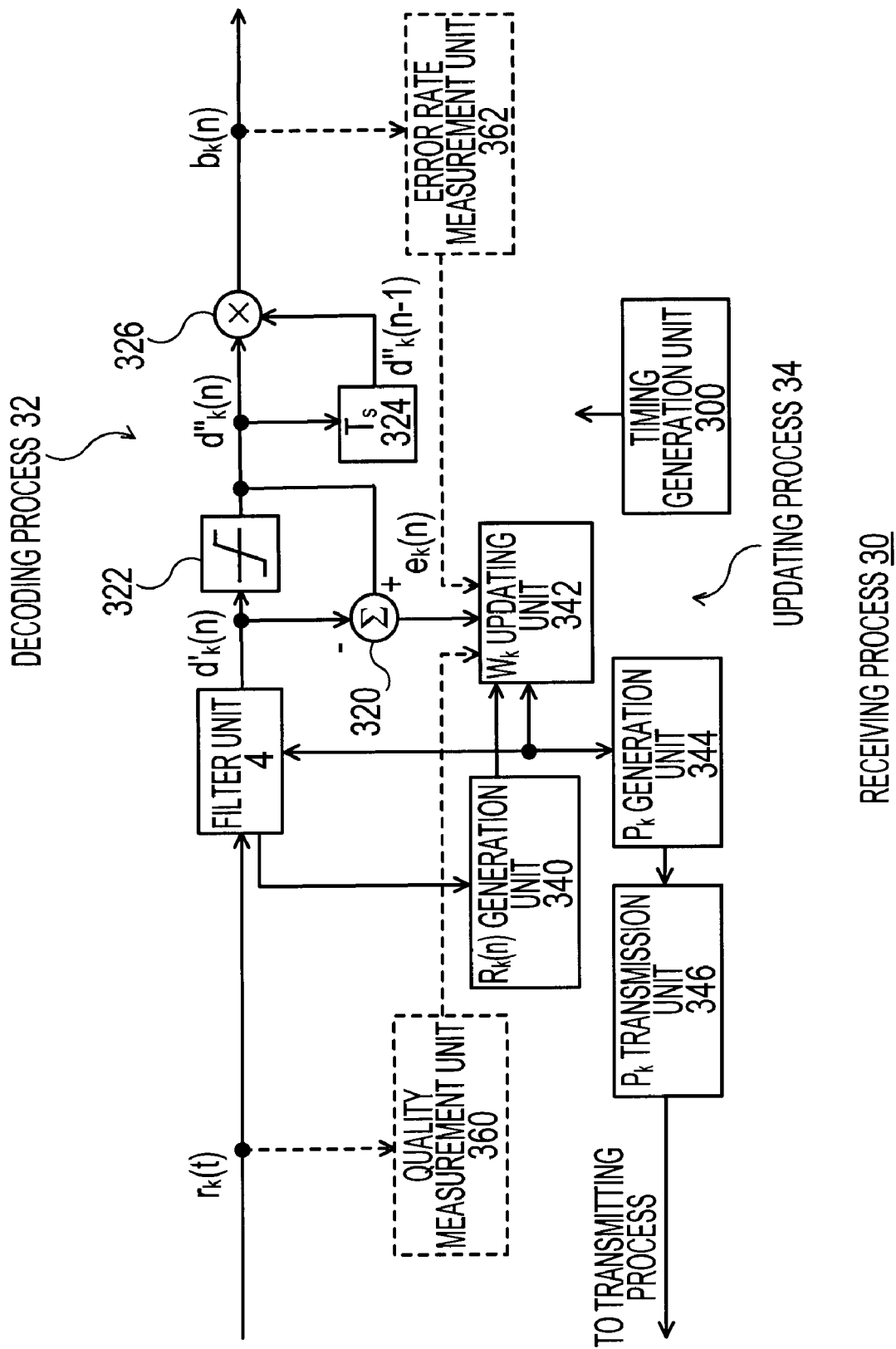
FIG. 6 illustrates a configuration of a receiving program executed by the transmitting device and the receiving device illustrated in FIG. 1.

FIG. 6 illustrates a configuration of a receiving program 30 executed by the transmitting device 2-$k$ and the receiving device 3-$k$ illustrated in FIG. 1.

Figure 7:
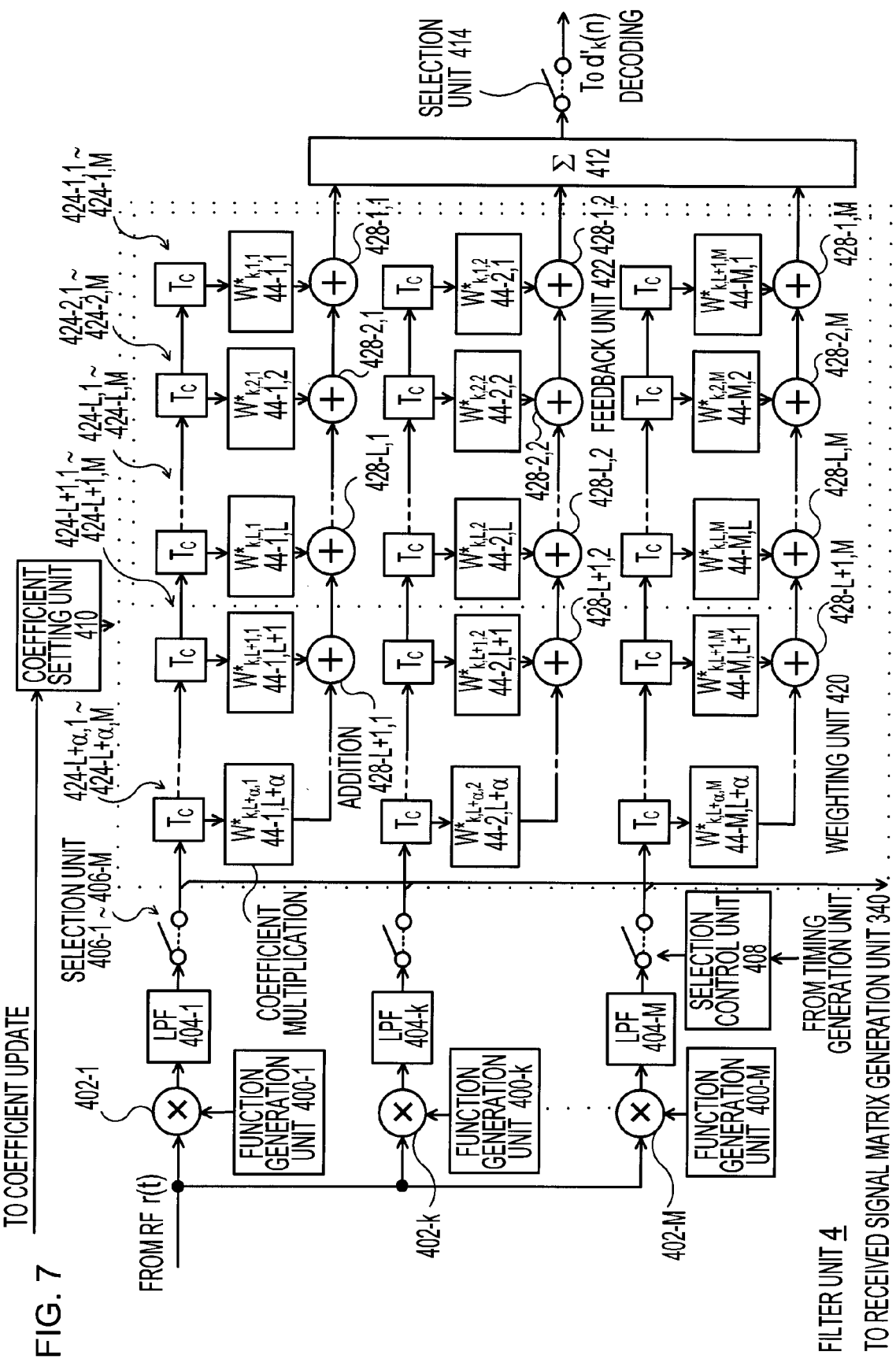
FIG. 7 illustrates a configuration of a filter unit of the receiving program illustrated in FIG. 6.

FIG. 7 illustrates a configuration of a filter unit 4 of the receiving program 30 illustrated in FIG. 6.

Figure 8:
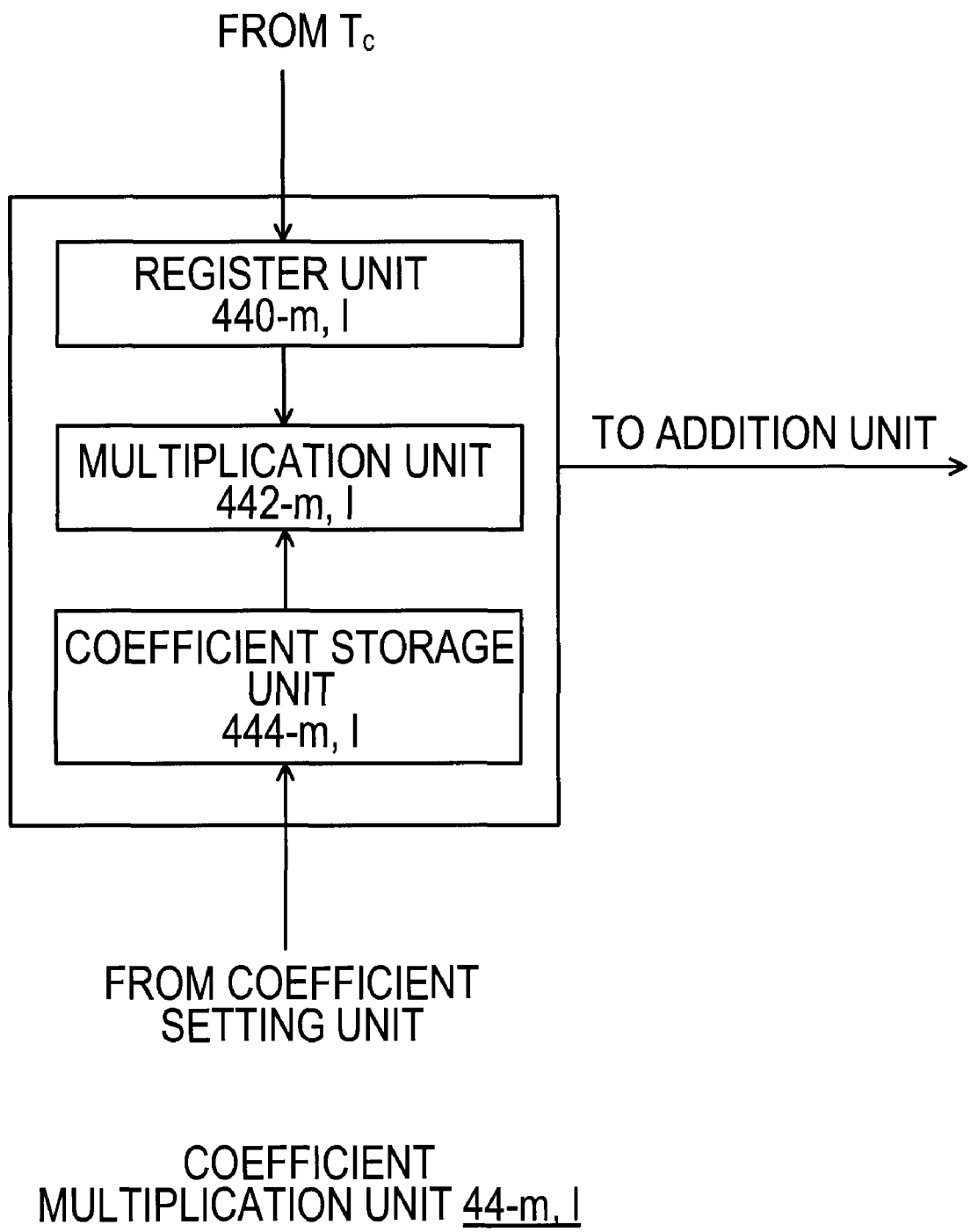
FIG. 8 illustrates a configuration of the coefficient multiplication unit illustrated in FIG. 7.

FIG. 8 illustrates a configuration of the coefficient multiplication unit 44 illustrated in FIG. 7.

As illustrated in FIG. 6, the receiving program 30 includes a timing control unit 300, a filter unit 4, a decoding unit 32, and an updating unit 34.

The decoding unit 32 includes an addition unit (Σ) 320, a demodulation unit 322, a delay unit 324, and a multiplication unit 326.

The updating unit 34 includes a received signal matrix ($R_k(n)$) generation unit 340, a weight ($W_k$) updating unit 342, a hopping pattern ($P_k$) generation unit 344, and a hopping pattern ($P_k$) transmission unit 346.

As illustrated in FIG. 7, the filter unit 4 illustrated in FIG. 7 includes an M number of function generation units 400-1 to 400-M each corresponding to an element of the frequency domain of the hopping pattern $P_k$; multiplication units 402-1 to 402-M, low pass filter (LPF) units 404-1 to 404-M, selection units 406-1 to 406-M, and 414, a selection control unit 408, a coefficient setting unit 410, a weighting unit 420 including a hopping pattern corresponding portion 422 containing an M×L number of elements each corresponding to a hopping pattern $P_k$, and a total sum calculation unit (Σ) 412, which constitute an FIR filter.

Note that in the following description, for the purpose of clarifying the description, the reference numeral or reference character may be followed by ( ) such as (1, 1), and thus the reference numeral or reference character may be different between the following description and the corresponding drawing.

The weighting unit 420 includes an M×(L+α) number of delay units 424-(1, 1) to 424-(M, L) and 424-(1, L+1) to 424-(M, L+α), an M×(L+α) number of coefficient multiplication units 44-(1, 1) to 44-(M, L) and 44-(1, L+1) to 44-(M, L+α), and an M×(L+α−1) number of addition units 428-(1, 1) to 428-(M, L) to 428-(1, L+1) to 428-(M, L+α−1).

Of the components of the above weighting unit 420, the hopping pattern corresponding portion 422 corresponds to each of the M×L number of delay units 424-(1, 1) to 424-(M, L), coefficient multiplication units 426-(1, 1) to 426-(M, L), and addition units 428-(1, 1) to 428-(M, L).

It should be noted that apparently the technical scope of the present invention also covers the communication system 1 including a modified receiving program 30 which further increases each component of the weighting unit 420 such that the M×(L+α) number of delay units 424, coefficient multiplication units 44 or the M×(L+α−1) number of addition units are increased to the (M+1)×(L+α) number or the (M+1)×(L+α−1) number thereof, or further increase the number of each component of the weighting unit 420.

As illustrated in FIG. 8, the coefficient multiplication unit 44-$m$, $l$ illustrated in FIG. 7 includes a register unit 440-$m$, $l$, a multiplication unit 442-$m$, $l$, and a coefficient storage unit 444-$m$, $l$.

Note that the delay units 424-$m$, $l$ to (m, L+α) and the register units 440-$m$, 1 to (m, L+α) illustrated in FIG. 7 serve as L+α stages of shift registers which shift complex data received from the previous stage to the following stage every $T_c$.

The receiving program 30 executed by the receiving device 3-$k$ uses the above components to receive a transmission signal from the transmitting devices 2-1 to 2-K via the antenna 210, the RF 208, and the A/D 212 (FIG. 3), and decodes a message symbol b'$_k$(n) from the digital-converted transmission signal s'$_k$(t) to output the message symbol to the network or the like.

In addition, the receiving program 30 updates the weight matrix ($W_k$) expressed in an M×(L+α) matrix used by the filter unit 4 by repeating the update a predetermined number of times so as to decode the message symbol b'$_k$(n) corresponding to the message symbol b$_k$(n) in the transmitting device 2-$k$ belonging to the same pairs with excellent performance from the transmission signal s'$_k$(t) received from the transmitting devices 2-1 to 2-K.

Of the updated weight matrices $W_k$, the receiving program 30 transmits (feeds back) the element corresponding to the hopping pattern corresponding portion 422 to the transmitting device 2-$k$ via the D/A 206, the RF 208 and the antenna 210 as illustrated in FIG. 2 so as to update the hopping pattern $P_k$.

That is, the hopping pattern $P_k$ is defined as complex conjugates $w_{k, m, l}$ of numbers $w^*_{k, m, l}$ multiplied by a (first to M-th row)×(first to L-th column) of elements starting with the element inputted to the filter unit 4 early in the weight matrices $W_k$ (* preceded by a symbol denotes a complex conjugate number indicated by the symbol).

It should be noted that the technical scope of the present invention also covers the communication system 1 including a modified receiving program 30 which associates the hopping pattern $P_k$ with an element of a weight matrix $W_k$ different from the above in the time axis direction.

As illustrated in FIGS. 6 to 8, in the receiving program 30 executed by the receiving device 3-$k$, the timing control unit 300 controls the timing of the operation of each component of the receiving program 30 so as to be synchronized with the message symbol b$_k$(n) and the chip illustrated in FIG. 5.

The selection control unit 408 controls the timing of the selection of each of the selection units 406 and 414.

The digital message symbol r(t) is inputted to the multiplication units 402-1 to 402-M of the filter unit 4 of the receiving program 30.

Each function generation unit 400-$m$ generates a function $e^{-j2\pi\zeta_m t}$, and outputs the function to the multiplication unit 402-$m$.

Note that in the function $e^{-j2\pi\zeta_m t}$, j is $(-1)^{1/2}$, and $\zeta_m$(Hz) denotes a frequency of the m-th tone of the spectrum spread transmission signal such as $\zeta_m=(m-1)/T_c$(Hz).

Each multiplication unit 402-$m$ operates as a quadrature modulator and performs complex multiplication on the transmission signal r(t) inputted from the A/D 212 (FIG. 3) and the function $e^{-j2\pi\zeta_m t}$ inputted from the function generation unit 400-$m$ to output the complex multiplication result r(t)$e^{-j2\pi\zeta_m t}$ to the LPF 404-$m$.

Each LPF 404-$m$ is implemented, for example, by an integrator which integrates the multiplication result r(t) $e^{-j2\pi\zeta_m t}$ inputted from the multiplication unit 402-$i$ from the time $nT_s+(l-1)T_c+\tau_{k, k, 1}$ to the time $nT_s+lT_c+\tau_{k, k, 1}$.

In this case, each LPF 404-$m$ passes the frequency component $r_{k, m, l}$(n) of an m-th tone of an l-th chip for the purpose of decoding an n-th message symbol b$_k$(n) and outputs frequency component to the selection unit 406-$m$.

In a timing ($t=T_s+lT_c+\tau_{k, k, 1}$) when each LPF unit 404-$m$ completes integration, the selection unit 406-$m$, according to the control of the selection control unit 408, selects the frequency component $r_{k, m, l}$(n) inputted from the LPF 404-$m$ and outputs the frequency component to the delay unit 424-$m$, 1 and the received signal matrix generation unit 340.

When the frequency component $r_{k, m, L+\alpha}$(n) of an m-th tone is inputted from each selection unit 406-$m$, the delay unit 424-($m$, L+α) continuously outputs the frequency component $r_{k, m, L+\alpha}$(n) of an (L+α−1) th chip giving a delay of $T_c$ to each register 440-$m$, L+α and stores the frequency component therein.

Note that likewise, other delay units 424 also continuously each output the frequency component $r_{k, m, l}$ to the corresponding register 440. The operation of the filter unit 4 is stabilized by continuously outputting a value to each register 440 during the time period of $T_c$.

Moreover, each delay unit 424-($m$, L+α) sequentially gives a delay of $T_c$ to the frequency component $r_{k, m, L+\alpha}$(n) inputted from each selection unit 406-$m$ at a cycle of $T_c$ and outputs the result to each delay unit 424-($m$, L+α−1) at the following stage.

When each of the (L+α−1) to second frequency component $r_{k, m, L+\alpha-1}$(n) to $r_{k, m, 2}$(n) is inputted from each of the delay units 424-($m$, L+α) to 424-($m$, 3) at the previous stage, each of the delay units 424-($m$, L+α−1) to 424-($m$, 2) outputs the (L+α−2) to first frequency component $r_{k, m, L+\alpha-2}$(n) to $r_{k, m, 1}$(n) giving a delay of $T_c$ at the previous stage to the register 440-$m$, $l$ and stores it therein.

In addition, each of the delay units 424-($m$, L+α−1) to 424-($m$, 2) sequentially gives a delay of $T_c$ to the (L+α) to third frequency component $r_{k, m, L+\alpha}$(n) to $r_{k, m, 3}$(n) inputted from each of the delay units 424-($m$, L+α) to 424-($m$, 3) at the previous stage at a cycle of $T_c$ and outputs the result to each of the delay units 424-($m$, L+α−2) to 424-($m$, 1) at the following stage.

When each second frequency component $r_{k, m, 2}$(n) is inputted from each delay unit 424-($m$, 2) at the previous stage, each delay unit 424-($m$, 1) outputs the first frequency component $r_{k, m, 1}$(n) giving a delay of $T_c$ at the previous stage to each register 440-$m$, 1 and stores the frequency component therein.

Each register 440-$m$, $l$ holds the frequency component $r_{k, m, 1}$(n) inputted from the delay unit 424-$m$, $l$ and outputs the frequency component to each multiplication unit 442-$m$, $l$.

Each coefficient storage unit 444-$m$, $l$ holds each element m, l (weight $w_{k, m, l}$) of the weight matrix ($W_k$) set by the weight updating unit 342 (FIG. 6) and outputs the element to each multiplication unit 442-$m$, $l$.

Each multiplication unit 442-($m$, L+α) performs complex multiplication on each of the frequency components $r_{k, m, L+\alpha}(n)$ inputted from the registers 440-($m$, L+$\alpha$), the weight $w_{k, m, L+\alpha}$, and the complex conjugate number $w^*_{k, m, L+\alpha}$ and outputs the multiplication results to each addition unit 428-($m$, L+$\alpha$–1).

Each of the multiplication units 442-($m$, L+$\alpha$–1) to 442-($m$, 1) performs complex multiplication on each of the frequency components $r_{k, m, L+\alpha}(n)$ to $r_{k, m, 1}(n)$, the weights $w_{k, m, L+\alpha}$ to $w_{k, m, 2}$, and the complex conjugate numbers $w^*_{k, m, L+\alpha}$ to $W^*_{k, m, 1}$ and outputs the multiplication results to the respective addition units 428-($m$, L+$\alpha$–1) to 424-($m$, 1).

Each of the addition units 428-($m$, L+$\alpha$–1) to 428-($m$, 2) performs complex addition on the multiplication results inputted from the respective multiplication units 442-($m$, L+$\alpha$–1) to 442-($m$, 2) and the addition results inputted from the respective addition units 428-($m$, L+$\alpha$) to ($m$, 3), and outputs the addition results to the respective addition units 428-($m$, L+$\alpha$–2) to 428-($m$, 1).

The addition unit 428-($m$, 1) performs complex addition on the multiplication results inputted from the multiplication unit 442-($m$, 1) and the addition results inputted from the addition unit 428-($m$, 2) and outputs the addition results to the total sum calculation unit 412.

The total sum calculation unit 412 calculates the total sum of the addition results inputted from the addition unit 428-($m$, 1) and outputs the complex filter output data $d'_k(n)$ to the selection unit 414.

The selection unit 414 selects the filter output data $d'_k(n)$ calculated by the total sum calculation unit 412, and outputs the data to the demodulation unit 322 (FIG. 6).

The received signal matrix generation unit 340 generates an (L+$\alpha$)×M of received signal matrices $R_k(n)$ from all frequency components for decoding an n-th symbol outputted from each LPF 404-$m$, namely, the frequency components $r_{k, m, 1}(n)$ to $r_{k, m, L}(n)$ and a part of the frequency components $r_{k, m, l}(n+1)$ (in the case of L>$\alpha$, the frequency components $r_{k, m, 1}(n+1)$ to $r_{k, m, \alpha}(n+1)$ is also written as the frequency components $r_{k, m, L+1}(n)$ to $r_{k, m, L+\alpha}(n)$), and outputs received signal matrices $R_k(n)$ to the weight updating unit 342.

The weight updating unit 342 processes the received signal matrix $R_k(n)$ inputted from the received signal matrix generation unit 340, for example, using an N-LMS (normalized least mean square) algorithm.

The weight updating unit 342 uses the above processing results and the error data $e_k(n)$ inputted from the addition unit 320 to optimize the weight $w_{k, m, 1}$ contained in the weight matrix ($W_k$) so as to decode the message symbol $b_k(n)$ from the transmission signal $r_k(t)$ received from the transmitting device 2-$k$ with better performance.

The hopping pattern generation unit 344 extracts a portion corresponding to the hopping pattern corresponding portion 422 from the weight $w_{k, m, l}$ updated by the weight updating unit 342 to generate a hopping pattern $P_k$ containing the weight $w_{k, m, 1}$ to $w_{k, m, L}$ and outputs the pattern to the hopping pattern transmission unit 346.

The hopping pattern transmission unit 346 outputs the message symbol $b_k(n)$ indicating the hopping pattern $P_k$ inputted from the hopping pattern generation unit 344 to the transmitting program 22 (FIG. 4) executed by the receiving device 3-$k$ so as to be transmitted to the transmitting device 2-$k$ via the A/D 212, the RF 208 and the antenna 210.

The demodulation unit 322 performs a process using a signum function (sgn(x); also called a code function) on the filter output data $d'_k(n)$ received from the filter unit 4 to obtain the complex reference data $d''_k$ as the processing result, and outputs the reference data to the delay unit 324 and the multiplication unit 326.

Note that the signum function sgn(x) is defined such that if x is positive (x>0), +1 is returned; if x is negative (x<0), –1 is returned; and if x=0, 0, +1 or –1 is appropriately returned;

Note that generally x is unlikely to be 0 due to noise, there no practical need to define the value returned by the signum function in the case of x=0.

The delay unit 324 delays, by $T_s$, the reference data $d''_k(n)$ outputted from the demodulation unit 322 and outputs the reference data to the multiplication unit 326.

Note that as discussed later as the performance evaluation of the communication system 1, the weight adjustment (training) of the filter unit 4 is performed using known data (pilot) preliminarily stored in the transmitting device 2 and the filter unit 4, the above described process (differential decoding) by the above described demodulation unit 322 and the delay unit 324 is not required.

In this case, in the receiving device 3, the reference data $d''_k(n)$ is assumed to be the demodulated message symbol $b_k(n)$.

The multiplication unit 326 multiplies the reference data $d''_k(n)$ inputted from the demodulation unit 322 and the reference data $d''_k(n-1)$ delayed by the delay unit 324 to decode the message symbol $b_k(n)$ and outputs the message symbol $b_k(n)$ to a network or the like connected to the receiving device 3-$k$.

The addition unit 320 subtracts the filter output data $d'_k(n)$ outputted from the processing result data filter unit 4 from the reference data $d''_k(n)$ outputted from the demodulation unit 322 to generate the error data $e_k(n)$ and outputs the error data $e_k(n)$ to the weight updating unit 342.

[Communication Between Transmitting Device 2-$k$ and Receiving Device 3-$k$]

Hereinafter, the communication between the transmitting device 2-$k$ and the receiving device 3-$k$ which transmit the message symbol $b_k(n)$ to each other as a pair of communication devices in the communication system 1 (FIG. 1) will be described.

[Transmitting Device 2-$k$]

First, the process in the transmitting device 2-$k$ will be described.

In the transmitting device 2-$k$, the multiplication unit 222 of the transmitting program 22 (FIG. 4) receives the message symbol $b_k(n)$ from the network or the like.

The multiplication unit 222 and the delay unit 224 processes the inputted message symbol $b_k(n)$ to generate a differentially encoded complex symbol $d_k(n)$ and outputs the symbol $d_k(n)$ to the delay unit 224.

The differentially encoded complex symbol $d_k(n)$ is defined as $d_k(n)=b_k(n) d_k(n-1)$ using an n-th inputted message symbol $b_k(n)$ and an (n–1)-th generated differentially encoded complex symbol $d_k(n-1)$.

Meanwhile, the hopping pattern setting unit 242 sets an initial value of the hopping pattern $P_k$ or the hopping pattern $P_k$ updated by the receiving device 3-$k$ of the communication party and received by the hopping pattern receiving unit 240, to the frequency synthesizer unit 244.

The frequency synthesizer unit 244 uses the set hopping pattern $P_k$ to generate a signature waveform signal $c_k(t)$ defined in the following expression 2 and outputs the signal $c_k(t)$ to the multiplication unit 226.

[Expression 2]

$$c_k(t) = \sum_{l=1}^{L} a_{k,l}(t - (l-1)T_c) \quad (2)$$

In the expression 2, $T_c$ denotes the time length of the chip illustrated in FIG. 5 and defined as $T_c > t > 0$; and $\alpha_{k,l}(t)$ defines an l-th chip waveform defined as the following expression 3.

[Expression 3]

$$a_{k,l}(t) = g(t) \sum_{m=1}^{M} p_{k,l,m} e^{j2\pi \xi m t} \quad (3)$$

In the expression 3, the rectangular function g(t) is defined as the following expression 4.

[Expression 4]

$$g(t) = \begin{cases} 1 & (0 < t < T_c) \\ 0 & (\text{otherwise}) \end{cases} \quad (4)$$

Meanwhile, as described above, the frequency hopping pattern $P_k$ used to spread spectrum of the message symbol $b_k(n)$ in the transmitting device 2-k can be defined as an M×L matrix shown in the following expression 5.

Note that in the expression 5, L denotes the number of chips contained in one message symbol illustrated in FIG. 5; and M denotes the number of tones used for frequency hopping.

[Expression 5]

$$P_k = \begin{bmatrix} p_{k,1,1} & p_{k,1,2} & \cdots & p_{k,1,M} \\ p_{k,2,1} & p_{k,2,2} & \cdots & p_{k,2,M} \\ \vdots & \vdots & \ddots & \vdots \\ p_{k,L,1} & p_{k,L,2} & \cdots & p_{k,L,M} \end{bmatrix} \quad (5)$$

The multiplication unit 226 multiplies the signature waveform signal $c_k(t)$ inputted from the hopping pattern setting unit 242 and the differentially encoded complex symbol $d_k(n)$ inputted from the multiplication unit 222 to generate the transmission signal $s_k(t)$ defined in the following expression 6 as the multiplication result and outputs the transmission signal $s_k(t)$ to the D/A 206.

The D/A 206, the RF 208, and the antenna 210 (FIG. 3) transmit the inputted transmission signal $s_k(t)$ to the receiving device 3-k of the communication party.

[Expression 6]

$$s_k(t) = \sum_{n=0}^{\infty} d_k(n) c_k(t - nT_s) \quad (6)$$

Note that in the expression 6, $T_s$ denotes the code time length of the message symbol $b_k(n)$ illustrated in FIG. 5 and defined as $LT_s = T_c$.

Moreover, the expression 6 indicates differentially encoded complex symbol $d_k(n) = b_k(n) \cdot d_k(n-1)$ and a differentially encoded complex symbol transmitted during $nT_s > t > (n-1)T_s$.

As described above, the message symbol $b_k(n)$ is generated, for example, assuming that a QPSK modulation system is used.

[Transmission Channel Between Transmitting Device 2-k and Receiving Device 3-k]

Next, a non-target signal received by the transmitting device 2-k illustrated FIG. 1 and the like will be described.

In the communication system 1, a transmission signal is transmitted independently to each pair of communication devices.

In this case, the receiving device 3-k receives transmission signals from the transmitting devices 2-1 to 2-(k−1), 2-(k+1) to 2-K as illustrated in FIG. 2.

In other words, the receiving device 3-k receives not only a transmission signal from the receiving device 3-k of the communication party but also unwanted signals and noise from the transmitting devices 2-k' of other pairs.

Note that in FIG. 2, $h_{k',k}(t)$ denotes a complex impulse response function which the path from the transmitting device 2-k' to the receiving device 3-k gives to a transmission signal from the transmitting device 2-k' to the receiving device 3-k, and is defined in the following expression 7.

In addition, in FIG. 2, AWGN denotes additive white Gaussian noise which the receiving device 3-k receives together with the transmission signals.

Note that in the expression 7, $h_{k',i}$ denotes a complex gain constant defined in an i-th transmission channel; and $\tau_{k',k,i}$ ($Tc > \tau_{k',k,i} > 0$) denotes a delay defined in an i-th transmission channel.

In addition, in the expression 7, $h_{k',k}$ denotes the number of paths contained in the path from the transmitting device 2-k to the receiving device 3-k.

[Expression 7]

$$h_{k',k}(t) = \sum_{i=1}^{l_{k',k}} h_{k',k,i} \delta(t - T_{k',k,i}) \quad (7)$$

The transmission signal $r_k(t)$ received by the receiving device 3-k is formulated by the following expressions 8-1 and 8-2.

[Expression 8]

$$r_k(t) = \sum_{k'=1}^{K} (s_{k'}(t) * h_{k',k}(t)) + n(t) \quad (8\text{-}1)$$

$$= \sum_{k'=1}^{K} \sum_{n=0}^{\infty} \sum_{i=1}^{l_{k',k}} h_{k',k,i} d_k(n) c_k(t - nTs - T_{k',k,i}) + n(t) \quad (8\text{-}2)$$

[Receiving Device 3-k]

Next, the process in the receiving device 3-k will be described.

In the receiving device 3-k, the RF 208 (FIG. 3) receives a transmission signal $r_k(t)$ shown in the expressions 8-1 and 8-2 via the antenna 210, converts the transmission signal to a transmission signal $s_k(t)$ of a baseband or an intermediate frequency which can be processed by the DSP 202 and the like, and outputs the transmission signal $s_k(t)$ to the A/D 212.

The A/D 212 converts the transmission signal $r_k(t)$ inputted from the RF 208 to a digital transmission signal $r_k(t)$ and outputs the transmission signal $r_k(t)$ to the DSP 202 and the like.

The receiving program 30 (FIGS. 6 to 8) is executed in the DSP 202 and the like in the receiving device 3-k.

In the filter unit 4 of the receiving program 30, the multiplication unit 402-m multiplies the inputted transmission signal $r_k(t)$ by a function $e^{-j2\pi\eta_m t}$ and outputs the multiplication result $r(t)e^{-j2\pi\eta_m t}$ to the LPF 404-m.

Each LPF 404-m sequentially integrates the multiplication result $r(t)e^{-j2\pi\zeta_m t}$ during $nT_s+(l-1)T_c+\tau_{k',k,i}$ to $nT_s+l T_c+\tau_{k',k,i}$ as shown in the following expressions 9-1 and 9-2, and outputs the result to the weighting unit 420.

As a result of integration by the LPF 404-m, as shown in the following expressions 9-1 and 9-2, an m-th tone of component contained in the transmission signal $r_k(t)$ is separated individually.

[Expression 9]

$$r_{k,l,m}(n) = \int_{nT_s+(l-1)T_c+\tau_{k,k,1}}^{nT_s+lT_c+\tau_{k,k,1}} r_k(t)e^{-j2\pi\xi_m t} dt \quad (9\text{-}1)$$

$$= \int_{nT_s+(l-1)T_c+\tau_{k,k,1}}^{nT_s+lT_c+\tau_{k,k,1}} r_k(t)e^{-j\frac{2\pi(m-1)}{T_c}t} dt \quad (9\text{-}2)$$

Note that as described above, the expressions 9-1 and 9-2 assume $L+\alpha \geq l \geq 1$, $\zeta_m$(Hz) denotes an m-th tone frequency in the spectrum spread transmission signal, and is defined as $\zeta_m=(m-1)/T_c$(Hz).

The received signal matrix generation unit 340 generates a received signal matrix $R_k(n)$ defined in the following expression 10 from the frequency component $r_{k,m,1}(n)$, $r_{k,1}(n+1)$ obtained in the time length t $(nT_s+(L+\alpha)T_c+\tau_{k',k,i}>t>nT_s+\tau_{k',k,i})$.

[Expression 10]

$$R_k(n) = \begin{bmatrix} r_{k,1,1}(n) & r_{k,1,2}(n) & \cdots & r_{k,1,M}(n) \\ r_{k,2,1}(n) & r_{k,2,2}(n) & \cdots & r_{k,2,M}(n) \\ \vdots & \vdots & \ddots & \vdots \\ r_{k,L,1}(n) & r_{k,L,2}(n) & \cdots & r_{k,L,M}(n) \\ r_{k,1,1}(n+1) & r_{k,1,2}(n+1) & \cdots & r_{k,1,M}(n+1) \\ r_{k,2,1}(n+1) & r_{k,2,2}(n+1) & \cdots & r_{k,2,M}(n+1) \\ \vdots & \vdots & \ddots & \vdots \\ r_{k,\alpha,1}(n+1) & r_{k,\alpha,2}(n+1) & \cdots & r_{k,\alpha,M}(n+1) \end{bmatrix} \quad (10)$$

Meanwhile, the filter output data $d'_k(n)$ outputted from the filter unit 4 is defined in the following expression 11.

Note that in the expression 11, H denotes a complex conjugate and a transposition of the matrix; and tr denotes a trace of the matrix.

[Expression 11]

$$d'k(n) = tr\lfloor w_k^H(n)R_k(n) \rfloor \quad (11)$$

The demodulation unit 322 performs a process using a signum function on the filter output data $d'_k(n)$ as shown in the following expression 12 to generate reference data $d''_k(n)$.

Note that in the expression 12, sgn denotes a signum function, Re[x] denotes a real number component of a complex number x, and Im[x] denotes a imaginary number component of the complex number x.

[Expression 12]

$$d''k(n) = sgn[\text{Re}[\hat{d}_k(n)]] + j\, sgn[\text{Im}[\hat{d}_k(n)]] \quad (12)$$

The multiplication unit 326 performs complex multiplication on an n-th reference data $d''_k(n)$ and an (n-1)-th reference data $d''_k(n)$ as shown in the following expressions 13-1 to 13-3 to obtain the message symbol $b'_k(n)$.

[Expression 13]

$$\tilde{b}_k(n) = d''k(n)d''k*(n-1) \quad (13\text{-}1)$$
$$= (sgn[\text{Re}[\hat{d}_k(n)]] + j sgn[\text{Im}[\hat{d}_k(n)]]) \times \quad (13\text{-}2)$$
$$(sgn[\text{Re}[\hat{d}_k(n-1)]] + j sgn[\text{Im}[\hat{d}_k(n-1)]]) \quad (13\text{-}3)$$

The addition unit 320 subtracts the filter output data $d'_k(n)$ outputted from the filter unit 4 from the reference data $d''_k(n)$ outputted from the demodulation unit 322 to generate the error data $e_k(n)$ defined in the following expression 14 and outputs the error data $e_k(n)$ to the weight updating unit 342.

As will be apparent from the generation method, the error data $e_k(n)$ indicates the difference between the reference data $d''_k(n)$ and the filter output data $d'_k$. The weight updating unit 342 updates and optimizes the weight so as to minimize the value of the error data $e_k(n)$, namely, so that the value of the reference data $d''_k(n)$ comes close to the value of the filter output data $d'_k$.

[Expression 14]

$$e_k(n) = \tilde{d}_k(n) - tr\lfloor w_k^H(n)R_k(n) \rfloor \quad (14)$$

The weight updating unit 342 is defined in the following expression 15; uses the received signal matrix $R_k(n)$ and the error data $e_k(n)$ to update the weight matrix $W_k(n)$ used by the filter unit 4 to process an n-th message symbol $b_k(n)$ as shown in the following expression 16; generates a weight matrix $W_k(n+1)$ used to process an (n+1)th or later message symbol $b_k$; and outputs the weight matrix to the coefficient setting unit 410 of the filter unit 4 and hopping pattern generation unit 344.

[Expression 15]

$$W_k = \begin{bmatrix} w_{k,1,1} & w_{k,1,2} & \cdots & w_{k,1,M} \\ w_{k,2,1} & w_{k,2,2} & \cdots & w_{k,2,M} \\ \vdots & \vdots & \ddots & \vdots \\ w_{k,L,1} & w_{k,L,2} & \cdots & w_{k,L,M} \\ w_{k,L+1,1} & w_{k,L+1,2} & \cdots & w_{k,L+1,M} \\ w_{k,L+2,1} & w_{k,L+2,2} & \cdots & w_{k,L+2,M} \\ \vdots & \vdots & \ddots & \vdots \\ w_{k,L+\alpha,1} & w_{k,L+\alpha,2} & \cdots & w_{k,L+\alpha,M} \end{bmatrix} \quad (15)$$

[Expression 16]

$$W_k(n+1) = W_k(n) + \frac{\mu}{\|R_k(n)\|_F^2} R_k(n)e_k^*(n) \quad (16)$$

Note that $\|R_k(n)\|_F$ in the expression 15 denotes a Frobenius norm of the received signal matrix $R_k(n)$ defined in the following expression 17.

[Expression 17]

$$\|R_k(n)\|_F = \sqrt{\sum_{l=1}^{L+\alpha} \sum_{m=1}^{M} |r_{k,l,m}(n)|^2} \quad (17)$$

Each time the weight updating unit 342 updates the weight matrix $W_k(n+1)$, the coefficient setting unit 410 sets the element m, l(weight $w_{k, m, 1}(n)$) of a new weight matrix $W_k(n+1)$ to each coefficient storage unit 444-$m, l$ of the coefficient multiplication units 44-$(m, 1)$, for example, at the boundary of a message symbol inputted to the filter unit 4.

Note that as the initial value of the weight matrix $W_k$, for example, the weight matrix $W_k(0)$ defined in the following expression 18 is used.

Note that in the expression 18, T denotes a transposition of the matrix and $0_{\alpha \times M}T$ denotes a zero matrix with a size of $\alpha \times M$.

[Expression 18]

$$W_k(0) = [P_k^T(0) O_{\alpha \times M}^T]^T \quad (18)$$

The filter unit 4 uses the weight matrix $W_k(n+1)$ updated as described above to perform filtering on the next (n+1) th transmission signal $r_k(t)$. The decoding unit 32 processes the filter output data $d'_k(n+1)$ outputted from the filter unit 4 to decode the message symbol $b'_k(n)$ corresponding to the message symbol $b_k(n)$ processed by the transmitting program 22 executed in the transmitting device 2-$k$.

[Feedback of Hopping Pattern $P_k$]

Hereinafter, the feedback process of the hopping pattern $P_k$ from the receiving device 3-$k$ to the transmitting device 2-$k$ will be described.

The hopping pattern generation unit 344 of the receiving program 30 executed in the receiving device 3-$k$ extracts a part of the weight matrix $W_k$ inputted from the weight updating unit 342 corresponding to the hopping pattern corresponding portion 422 (FIG. 7) as shown in the expressions 19-1 and 19-2 to generate an new hopping pattern $P_k(\lambda)$ and outputs the hopping pattern $P_k(\lambda)$ to the hopping pattern transmission unit 346.

[Expression 19]

$$P_k(\lambda) \triangleq \begin{pmatrix} p_{k,1,1} & p_{k,1,2} & \cdots & p_{k,1,M} \\ p_{k,2,1} & p_{k,1,2} & \cdots & p_{k,2,M} \\ \vdots & \vdots & \ddots & \vdots \\ p_{k,L,1} & p_{k,L,2} & \cdots & p_{k,L,M} \end{pmatrix} \quad (19\text{-}1)$$

$$= \begin{bmatrix} w_{k,1,1}(\hat{n}_k) & w_{k,1,2}(\hat{n}_k) & \cdots & w_{k,1,M}(\hat{n}_k) \\ w_{k,2,1}(\hat{n}_k) & w_{k,2,2}(\hat{n}_k) & \cdots & w_{k,2,M}(\hat{n}_k) \\ \vdots & \vdots & \ddots & \vdots \\ w_{k,L,1}(\hat{n}_k) & w_{k,L,2}(\hat{n}_k) & \cdots & w_{k,L,M}(\hat{n}_k) \end{bmatrix} \quad (19\text{-}2)$$

Note that the expressions 19-1 and 19-2 exemplifies that the hopping pattern $P_k(\lambda)$ is fed back from the receiving device 3-$k$ to the transmitting device 2-$k$ at the time $t=\lambda T_f + \Delta_k + \alpha T_c + \tau_{k, k, 1}$.

In the expressions 19-1 and 19-2, $\lambda$ is defined as $N_f \geq \lambda \geq 1$; $N_f$ denotes the number of times the feedback is repeated; $T_f$ denotes a time interval of the feedback; $\Delta_k(T_f \geq \Delta_k \geq 0)$ denotes an offset time preliminarily determined for feedback timing.

Note that in the expressions 19-1 and 19-2, a transmission delay from the receiving device 3-$k$ to the transmitting device 2-$k$ is ignored.

Moreover, in the expressions 19-1 and 19-2, the symbol shown in the following expression 20 is defined in the following expression 21.

In the expression 21, $\{q\}$ denotes a maximum positive integer equal to or less than q.

[Expression 20]

$$\hat{n}_k \quad (20)$$

[Expression 21]

$$\hat{n}_k \triangleq \{(\lambda T_f + \Delta_k + \alpha T_c + \tau_{k,k,1})/T_s\} \quad (21)$$

The hopping pattern transmission unit 346 transmits the new hopping pattern $P_k(\lambda)$ inputted from the hopping pattern generation unit 344 to the transmitting device 2-$k$ via the A/D 212, the RF 208 and the antenna 210 (FIG. 3) as illustrated in FIG. 2.

In the transmitting program 22 executed in the transmitting device 2-$k$, the hopping pattern receiving unit 240 receives the hopping pattern $P_k(\lambda)$ from the receiving device 3-$k$ and outputs the hopping pattern $P_k(\lambda)$ to the hopping pattern setting unit 242.

The hopping pattern setting unit 242 sets the hopping pattern $P_k(\lambda)$ to the frequency synthesizer unit 244, which generates the signature wave signal $c_k(t)$ based on the hopping pattern $P_k(\lambda)$ and performs spread spectrum on the message symbol $b_k(n)$.

Note that the initial value $P_k(0)$ of the hopping pattern $P_k$ set by the frequency synthesizer unit 244 is sequentially optimized by updating the hopping pattern $P_k$ described above, and thus, for example, may be a value preliminarily determined by experiment or may be a random value.

In the above configured communication system 1, the data transmission between the transmitting device 2-$k$ and the receiving device 3-$k$ can minimize the ISI (intersymbol interference) and the MAI (multiple access interference).

Moreover, the update of the hopping pattern $P_k$ of the transmitting device 2-$k$ allows the reference data $d''_k(n)$ to achieve the MMSE (minimum mean-squared error) due to the update.

Therefore, according to the update of the hopping pattern $P_k$ described above, data transmission with an extremely small bit error rate (BER) can be provided between the transmitting device 2-$k$ and the receiving device 3-$k$.

[Overall Operation of Transmitting Device 2-$k$ and Receiving Device 3-$k$]

Hereinafter, the overall operation of the data transmission between the transmitting device 2-$k$ and the receiving device 3-$k$, the feedback of the hopping pattern $P_k$, and the update thereof will be described.

Figure 9:
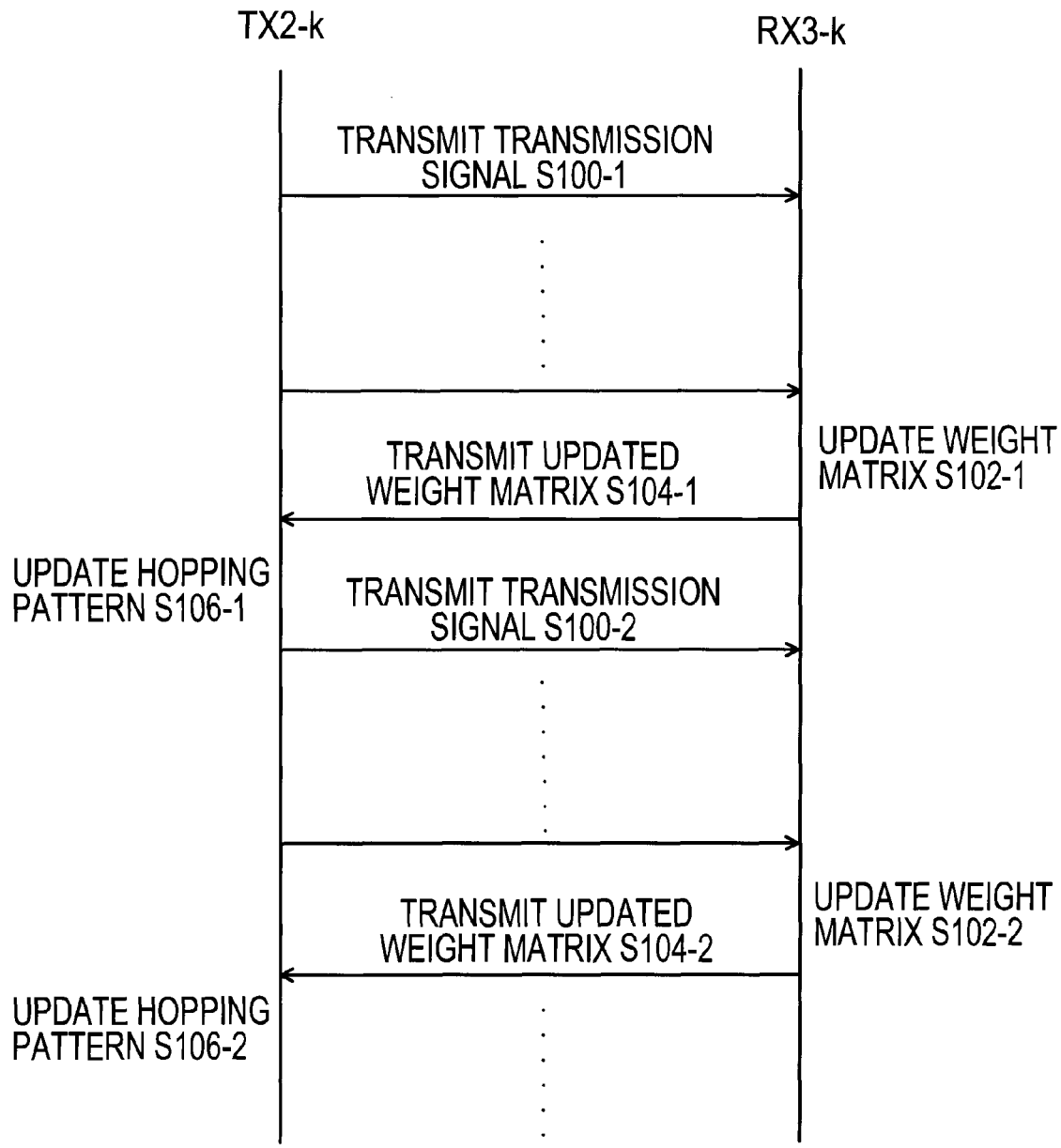

FIG. 9 illustrates a communication sequence diagram illustrating the data transmission and the feedback (S10) of the hopping pattern $P_k$ between the transmitting device 2-$k$ and the receiving device 3-$k$ illustrated in FIG. 1 and the like.

In step 100-1 (S100-1), the transmitting device 2-$k$ transmits a transmission signal $s_k(t)$ to the receiving device 3-$k$ a plurality of number of times.

In step 102-1 (S102-1), the receiving device 3-$k$ updates the weight matrix $W_k$ and the hopping pattern $P_k$ at the time intervals described by referring to the expressions 19-1 and 19-2.

In step 104-1 (S104-1), the receiving device 3-$k$ transmits or feeds back the updated hopping pattern $P_k$ to the transmitting device 2-$k$.

In step 106-1 (S106-1), the transmitting device 2-k updates the hopping pattern $P_k$ by replacing the previous hopping pattern $P_k$ with the new hopping pattern $P_k$ received from the receiving device 3-k and uses the updated hopping pattern $P_k$ for spread spectrum.

The above described process is repeated, for example, an $N_f$ number of times between the transmitting device 2-k and the receiving device 3-k.

[Variation]

Hereinafter, a variation of the communication system 1 (FIG. 1, etc.) will be described.

The description has been made such that the feedback of the hopping pattern $P_k$ and the update thereof are repeated an $N_f$ number of times between the transmitting device 2-k and the receiving device 3-k. However, for example, the number of times of the feedback and the update is not limited but the feedback and the update may be performed at a constant time interval or at random times.

Moreover, as illustrated by dotted lines in FIG. 6, the receiving program 30 may be configured such that a quality measurement unit 360 which measures the signal intensity or the SN (signal noise) ratio of the transmission signal $r_k(t)$ is added to the receiving program 30, and when the transmission signal quality becomes lower than a specified level, the updating unit 34 performs the feedback and the update of the hopping pattern $P_k$ to improve the transmission signal quality.

Moreover, if the message symbol $b_k(n)$ contains an error detection code, as illustrated by dotted lines in FIG. 6, the receiving program 30 may be configured such that an error rate measurement unit 362 which measures the error rate of the message symbol $b'_k(n)$ obtained by decoding is added to the receiving program 30, and when the error rate of the message data $b'_k(n)$ reaches or exceeds a specified level, the updating unit 34 performs the feedback and the update of the hopping pattern $P_k$ to reduce the error rate.

Moreover, the description has been made such that in the communication system 1, the transmitting device 2 and the receiving device 3 use frequency hopping to spread spectrum of the message symbol $b_k(n)$. However, for example, the communication system 1 may be configured such that the transmitting device 2 and the receiving device 3 use a hopping pattern made of two time domains or frequency components to perform the update and the feedback of the hopping pattern.

Moreover, the description has been made such that in the communication system 1, the weight matrix $W_k$ is optimized by the N-LMS algorithm to update the hopping pattern $P_k$, but the update optimization algorithm may be appropriately changed to another algorithm depending on the configuration and the application of the communication system 1 and the performance of the DSP 202.

EMBODIMENTS

Hereinafter, an embodiment of the communication system according to the present invention will be specifically described by focusing how the communication system 1 can improve the transmission performance between the transmitting device 2-k and the receiving device 3-k.

First, as the initial value of the hopping pattern $P_k$, a hopping pattern $P_k(0)$ with L=7, M=8 using frequency hopping codes proposed in Non-Patent Document 3 and an M number of Gold sequences with a length of L are used.

The frequency hopping code $y_k$ of the hopping pattern $P_k(0)$ is defined in the following expressions 22-1 and 22-2.

[Expression 22]

$$y_K = x_k \cdot \beta \oplus \gamma_k \cdot 1 \quad (22\text{-}1)$$

$$= [y_{k,1}, y_{k,2} \ldots y_{k,L}]^T \quad (22\text{-}2)$$

In the expression 22, $\beta = [\beta^0, \beta^1, \beta^2, \ldots, \beta^{L-1}]$; $\beta$ denotes an initial element of GF ($M=2^3$); $x_k, \gamma_k \delta$ GF($2^3$); and 1 denotes a column vector with an 1 number of elements in all and having a length of L.

In the expression 22, the symbol and "•" shown in the expression 23 denote addition and multiplication with respect to GF($2^3$) respectively.

[Expression 23]

$$\oplus \quad (23)$$

The value of $x_k, y_k$ with respect to a k-th signal is obtained by $(k-1) = y_k + x_k$. The element $v_{k, l, m}$ of (l, m) of an L×M matrix $V_k$ is defined in the following expression 24.

[Expression 24]

$$v_{k,l,m} = \begin{cases} 1 & (m = y_{k,l} + 1) \\ 0 & (m \neq y_{k,l} + 1) \end{cases} \quad (24)$$

Here, when an M number of diagonal matrix sets $Z_0, Z_1, \ldots Z_{M-1}$ each containing an M number of Gold sequences on the diagonal line thereof are defined, the initial hopping pattern $P_k(0)$ is defined as $P_k(0) = Z_{xk} V_k$.

For example, if k=2, $y_2$, $V_2$, $Z_{xk}=2$, $P_k(0)$ is as shown in the following expressions 25 to 27, 28-1, and 28-2.

[Expression 25]

$$y_2 = [1\ 2\ 4\ 3\ 6\ 7\ 5]^T \quad (25)$$

[Expression 26]

$$v_2 = \begin{bmatrix} 0 & 1 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 1 & 0 & 0 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 1 & 0 & 0 \end{bmatrix} \quad (26)$$

[Expression 27]

$$Z_{x2=1} = \begin{bmatrix} + & 0 & 0 & 0 & 0 & 0 & 0 \\ 0 & + & 0 & 0 & 0 & 0 & 0 \\ 0 & 0 & - & 0 & 0 & 0 & 0 \\ 0 & 0 & 0 & + & 0 & 0 & 0 \\ 0 & 0 & 0 & 0 & + & 0 & 0 \\ 0 & 0 & 0 & 0 & 0 & + & 0 \\ 0 & 0 & 0 & 0 & 0 & 0 & - \end{bmatrix} \quad (27)$$

[Expression 28]

$$P_2(0) = Z_{x2=1} V_2 \quad (28\text{-}1)$$

$$= \begin{bmatrix} 0 & + & 0 & 0 & 0 & 0 & 0 & 0 \\ 0 & 0 & + & 0 & 0 & 0 & 0 & 0 \\ 0 & 0 & 0 & 0 & - & 0 & 0 & 0 \\ 0 & 0 & 0 & + & 0 & 0 & 0 & 0 \\ 0 & 0 & 0 & 0 & 0 & 0 & + & 0 \\ 0 & 0 & 0 & 0 & 0 & 0 & 0 & + \\ 0 & 0 & 0 & 0 & 0 & - & 0 & 0 \end{bmatrix} \quad (28\text{-}2)$$

Figure 10:
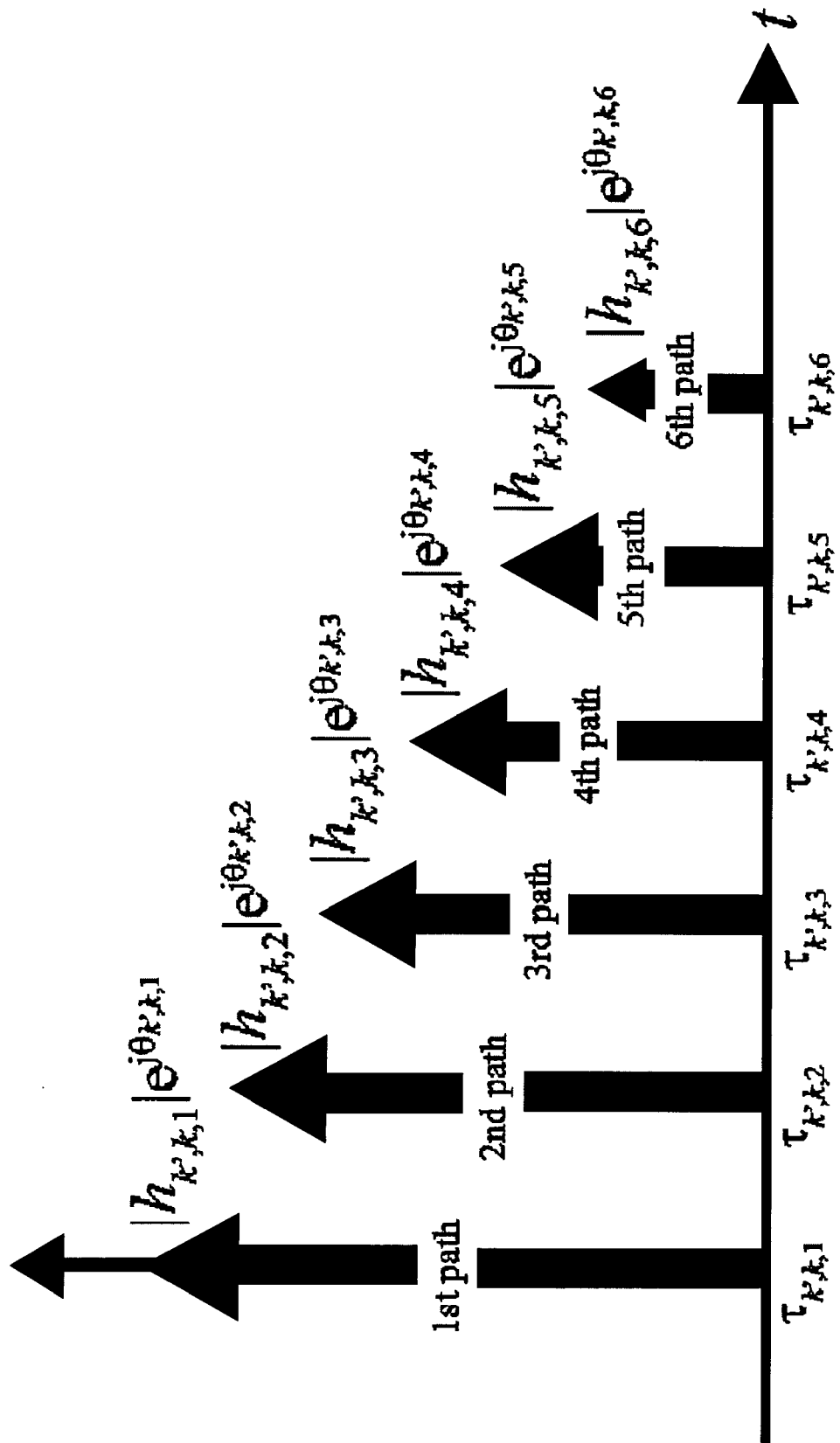
FIG. 10 illustrates a model of a path for evaluating the performance of the communication system.

FIG. 10 illustrates a model of a path for evaluating the performance of the communication system 1.

Further, in order to evaluate the performance of the communication system 1, as illustrated in FIG. 10, a six-path model indicating exponential decay performance is assumed ($I_{k', k}=6$ for every k, k').

As illustrated in FIG. 10, relative intensities $|h_{k', k, i}|$ are $20 \log_{10}|h_{k', k, i+1}|/|h_{k', k, i}|=-3$ dB (where i=1, 2, ..., $I_{k', k}-1$)).

The path delays $\tau_{k', k, i}$ are $\tau_{k', k, i+1}-\tau_{k', k, i}=(L+1)T_c/16$ (for $\approx T_c/16$; L=7). $\tau_{k', k, 1}$ for all k', k and $\theta_{k, k, i+1}$ for all k', k, i are statistically independent of each other and are uniformly distributed random variables in the interval of [0,T) and [0,2π).

Note that for simplifying the assumption, as described above, the amplitude attenuation is assumed to be the same −3 dB for all k', k, and $\tau_{k', k, 1}$, $\theta_{k, k, i+1}$ is assumed to be independent for all k', k, i, which provides a very strict path condition in the communication system 1.

The communication system 1 requires an initial training period from when the transmitting device 2 feeds back a part of weight matrix ($W_k$) to the receiving device 3 as the hopping pattern $P_k$ to when the transmitting device 2 is ready to generate an appropriate signature waveform signal $c_k(t)$ according to the actual path condition.

The communication system 1 assumes that the initial training period is $t<(N_f+1)T_f+\Delta_k+\tau_{k, k, 1}$ as described above.

The steady bit error rate (BER) in the communication system 1 shown below is obtained after the initial training period, and during the steady period, the weight matrix $W_k$ is updated only on the receiving device 3-k side, but the hopping pattern $P_k$ is not fed back to the transmitting device 2-k.

Moreover, the reference data $d''_k$ used to update the weight matrix $W_k$ is assumed to be $d''_k=d_k$ during the initial training period, which means that a pilot data symbol used during the initial training period is stored in the transmitting device 2 and the stored pilot data symbol is used during the initial training period.

The BER performance slightly depends on a randomly selected value $\tau_{k', k, 1}$, $\theta_{k, k, i+1}$, and thus points in the graphs in the following drawings are each an average of the values obtained by five simulations.

The simulation conditions including the above assumptions are listed in the following Table 1.

TABLE 1

| SIMULATION CONDITIONS | | | |
|---|---|---|---|
| | COMMUNICATION SYSTEM 1 | FCSS/ DS-CDMA | DS-CDMA (MF, RAKE) |
| Data | | QPSK | |
| $E_b/N_o$ | | 9.9 dB | |
| L | 7 | | 31 |

TABLE 1-continued

| SIMULATION CONDITIONS | | | |
|---|---|---|---|
| | COMMUNICATION SYSTEM 1 | FCSS/ DS-CDMA | DS-CDMA (MF, RAKE) |
| α | 0,7 | 0,31 | — |
| M | 8 | | 1 |
| $T_f$ | | $10^4 T_s$ | — |
| $N_f$ | | 0,10 | — |
| $\Delta_k$ | UNIFORMLY RANDOM DISTRIBUTED IN [0,Tf) | | — |
| OPTIMIZATION ALGORITHM | N-LMS (μ = 0.1) | | — |

[Performance Evaluation Results by Simulation]

Hereinafter, the results obtained by evaluating the performance of the communication system 1 by computer simulation will be described.

The computer simulation is used to compare the BER performance of the communication system 1 with the BER performance of a communication system which adopts the DS-CDMA using a conventional Gold sequence, uses a matched filter, and uses or does not use a RAKE combining method, and the BER performance of a communication system adopting the FCSS/CDMA system.

Figure 11:
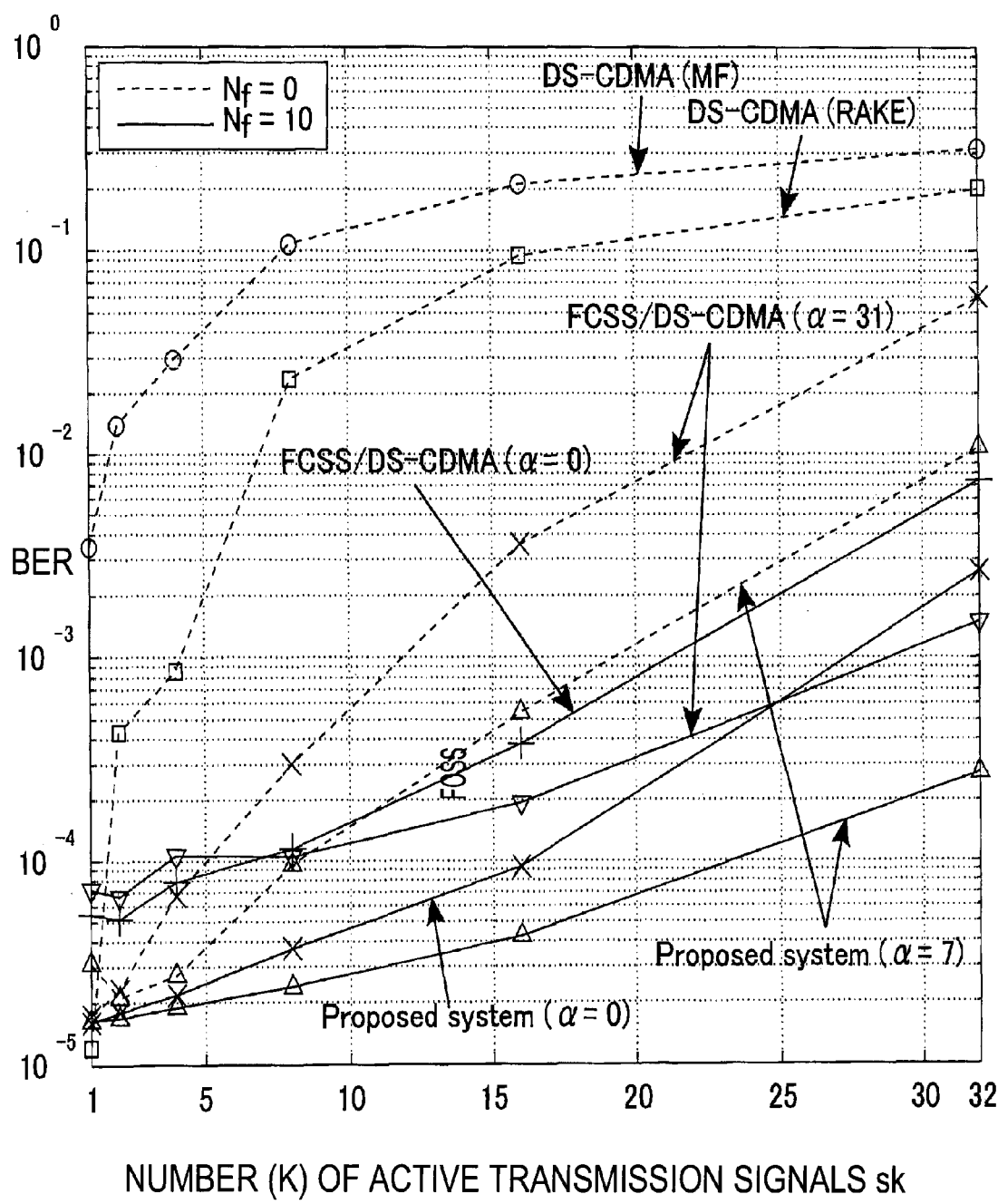
FIG. 11 is a graph of bit error rate performance with respect to the number of active transmission signals $s_k(t)$ in the communication system.

FIG. 11 is a graph of the BER performance with respect to the number of active transmission signals $s_k(t)$ in the communication system 1.

Figure 12:
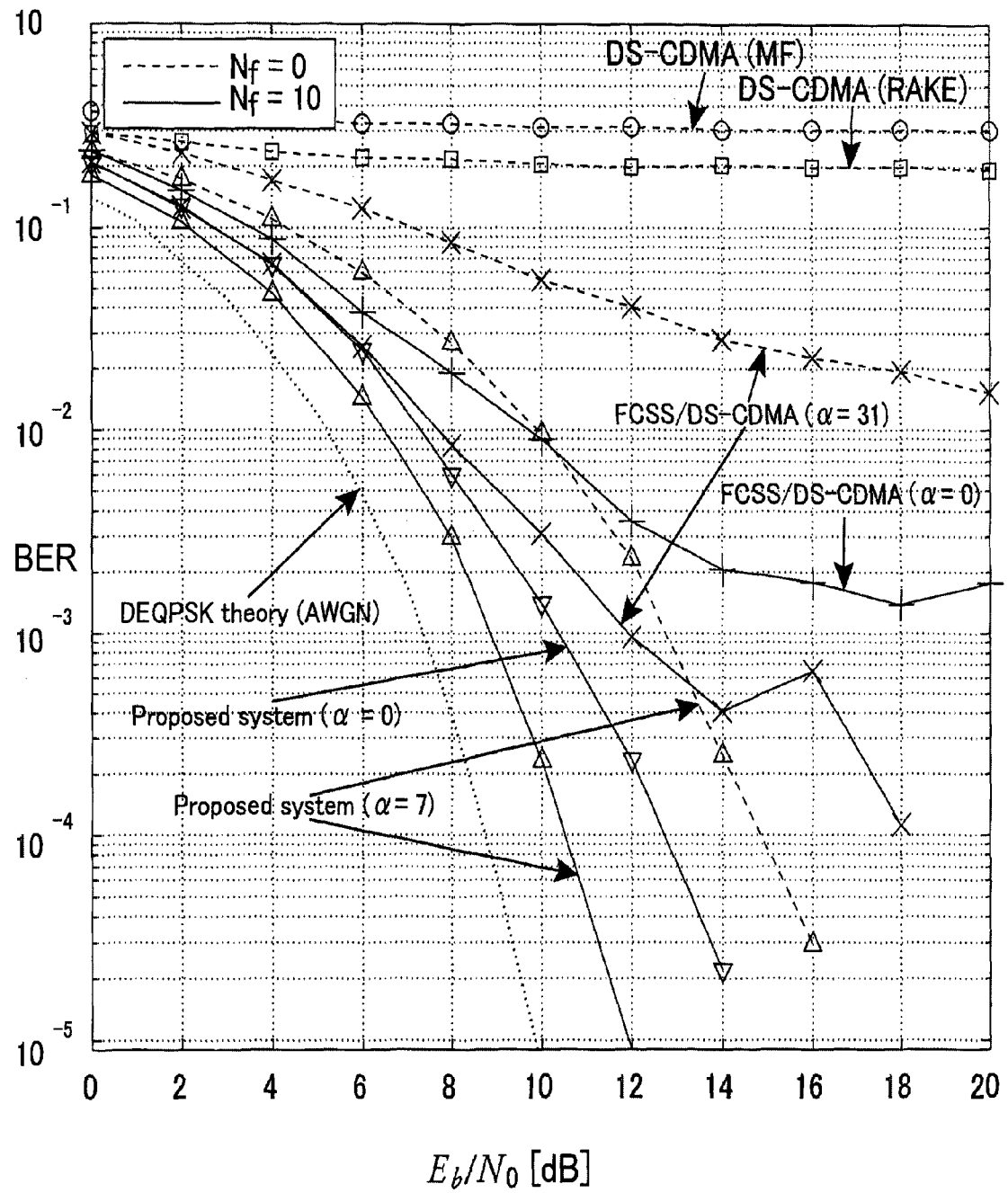
FIG. 12 is a graph of bit error rate performance with respect to $E_b/N_o$ for K=32.

FIG. 12 is a graph of the BER performance with respect to $E_b/N_o$ for K=32.

FIGS. 13A to 13D each are a graph illustrating an initial hopping pattern, the updated hopping pattern, and the corresponding power spectra.

Note that in FIG. 13, the tone level $p_{k, l, m}$ is indicated by the absolute value $|p_{k, l, m}|$.

As will be understood from FIG. 11, in the communication systems each adopting a conventional DS-CDMA system, as the number of active transmission signals $s_k(t)$ increases, the BER increases rapidly.

In contrast to this, in the communication system 1 with α=7 and $N_f=10$, as the number of active transmission signals $s_k(t)$ increases, the error rate increases most gradually.

Moreover, as will be understood from FIG. 12, in comparison with the system adopting the FCSS/DS-CDMA (α=31 and $N_f=10$), in the communication system 1 (α=7 and $N_f=10$), a gain of 0.3 dB is obtained when the BER is $10^{-3}$.

Figure 13B:
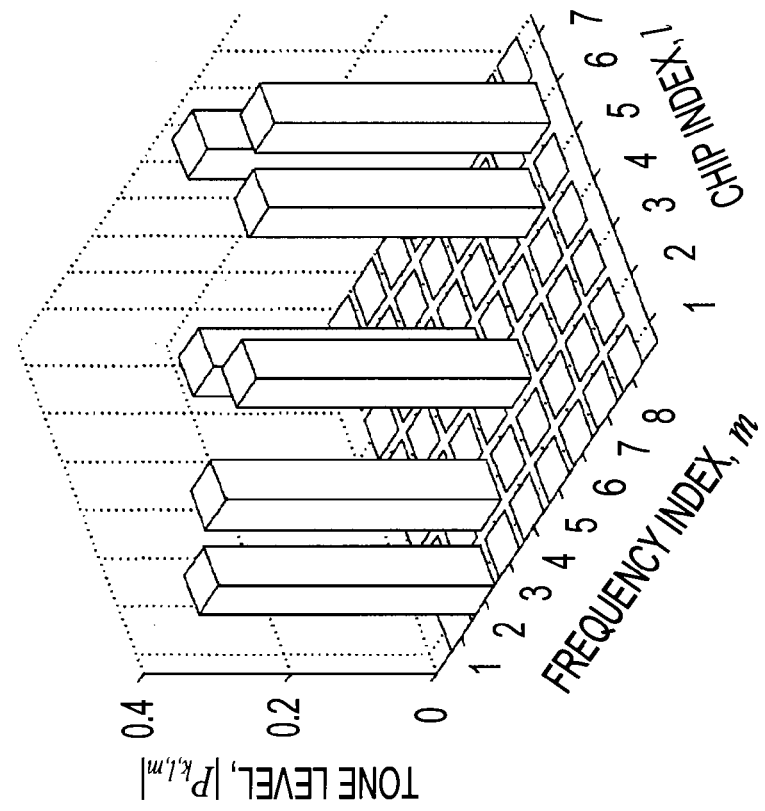
FIGS. 13A to 13D each are a graph illustrating an initial hopping pattern, the updated hopping pattern, and the corresponding power spectra.
Figure 13A:
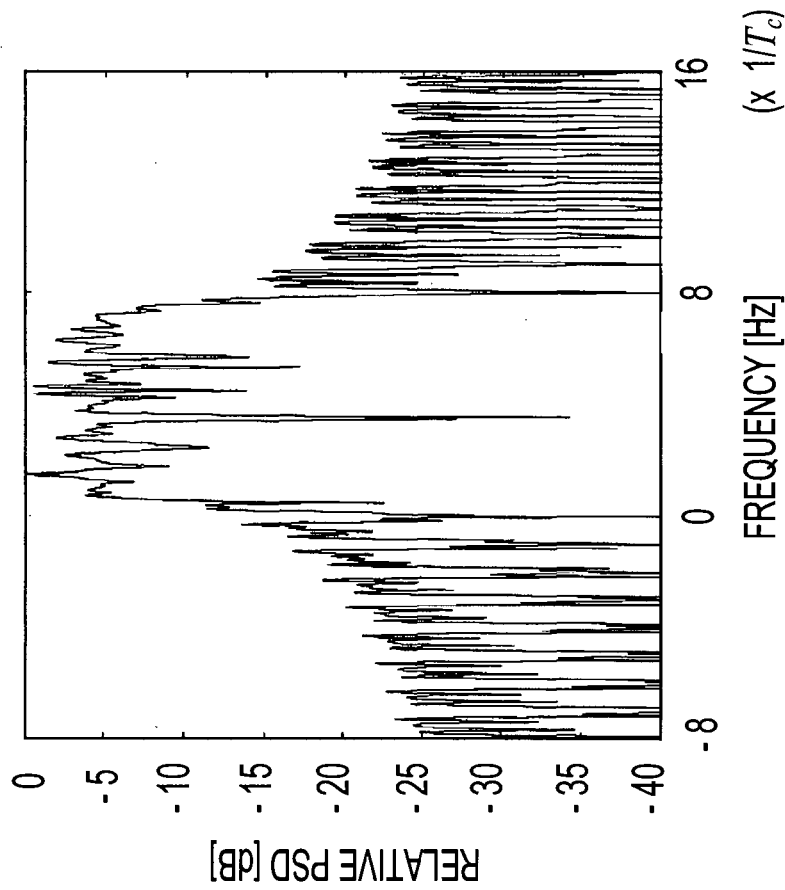
Figure 13D:
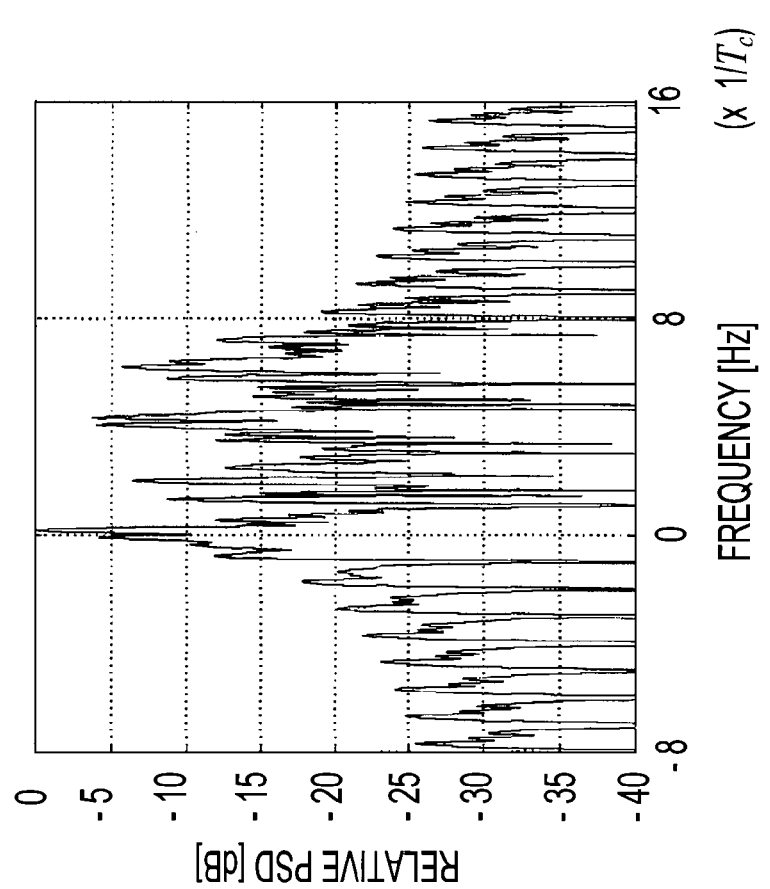
Figure 13C:
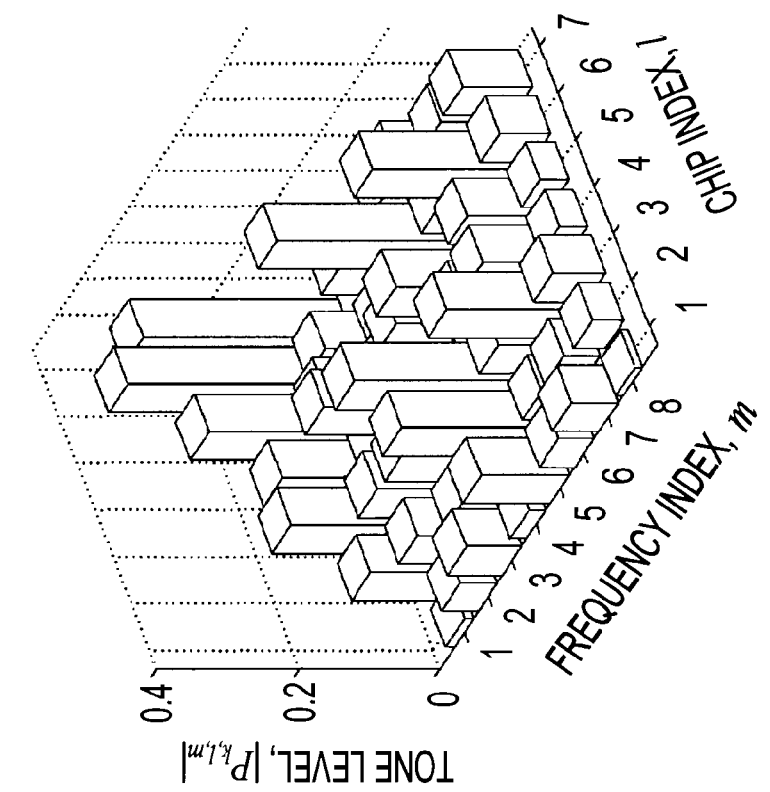

Moreover, as will be understood from FIG. 13C, the initial value $P_k(0)$ of the hopping pattern contains one tone for each chip, but the updated hopping pattern contains a plurality of tones for each chip.

The above embodiments are provided for illustration and explanation purposes, and do not cover all embodiments of the present invention.

Moreover, the above embodiments are not intended to limit the technical scope of the present invention to the particular forms disclosed, and various modifications and variations can be made by referring to the particular forms disclosed.

Further, the above embodiments are selected and described so as to describe the principle and actual applications of the present invention in the most appropriate manner. Therefore, based on the particular forms disclosed in the above embodiments, those skilled in the art can use the present invention and the embodiments thereof by making various modifications to be suitable for every possible actual application.

Further, the technical scope of the present invention is intended to be defined by the description and the equivalents.

DESCRIPTION OF SYMBOLS

| | |
|---|---|
| 1 | communication system |
| 2 | transmitting device |
| 200 | IF |
| 202 | DSP |
| 204, 216 | memory |
| 206 | D/A |
| 208 | RF |
| 210 | antenna |
| 212 | A/D |
| 214 | CPU |
| 218 | UI |
| 22 | transmitting program |
| 220 | timing control unit |
| 222, 226 | multiplication unit |
| 224 | delay unit |
| 240 | hopping pattern receiving unit |
| 242 | hopping pattern setting unit |
| 244 | frequency synthesizer unit |
| 3 | receiving device |
| 30 | receiving program |
| 300 | timing control unit |
| 32 | decoding unit |
| 320 | addition unit |
| 322 | demodulation unit |
| 324 | delay unit |
| 326 | multiplication unit |
| 34 | updating unit |
| 340 | received signal matrix generation unit |
| 342 | weight updating unit |
| 344 | hopping pattern generation unit |
| 346 | hopping pattern transmission unit |
| 4 | filter unit |
| 400 | function generation unit |
| 402 | multiplication unit |
| 406, 416 | selection unit |
| 404 | LPF unit |
| 408 | selection control unit |
| 410 | coefficient setting unit |
| 412 | total sum calculation unit |
| 420 | weighting unit |
| 422 | hopping pattern corresponding portion |
| 424 | delay unit |
| 428 | addition unit |
| 44 | coefficient multiplication unit |
| 440 | register |
| 442 | multiplication unit |
| 444 | coefficient storage unit |

INDUSTRIAL APPLICABILITY

The present invention can be used for data transmission by spread spectrum.

The invention claimed is:

1. A communication system including a plurality of pairs of a transmitting device and a receiving device,
wherein in each of the pairs,
the transmitting device comprises
a transmission section which, based on a spread pattern which includes a plurality of first elements defined with respect to components of a predetermined first number of first domains and components of a predetermined second number of second domains and spreads transmission data to the components of the first domains and the components of the second domains, sequentially spreads transmission data to the components of the first domains and the components of the second domains every predetermined time interval and transmits the transmission data as a transmission signal; and
an updating section which, based on the spread pattern received from the receiving device, updates the spread pattern used to spread the transmission data; and
wherein the receiving device comprises
a receiving section which receives the transmission signal;
an expansion section which sequentially expands the received transmission signal into a plurality of second elements defined with respect to components of the first domains whose number is equal to or greater than the first predetermined number and components of the second domains whose number is a third number which is greater than the second predetermined number at each of the predetermined time intervals;
a processing section which sequentially performs a process using a plurality of first coefficients defined for each of the second elements on the second elements obtained as a result of the expansion at each of the predetermined time intervals;
a generation unit which generates a new first coefficient using the processed second elements and the first coefficient;
selection means which selects a second coefficient corresponding to the spread pattern from within the new first coefficients as a new spread pattern; and
a pattern transmission unit which transmits the new spread pattern to the transmitting device.

2. The communication system according to claim 1, wherein the pairs include a pair of one of the transmitting device and the receiving device.

3. The communication system according to claim 1, wherein generation of a new first coefficient by the generation unit of the receiving device and selection of the second coefficient by the selection means of the receiving device are performed repeatedly.

4. The communication system according to claim 1,
wherein the receiving device further comprises a decoding unit which decodes the transmission data from the received transmission signal, and
wherein the generation unit of the receiving device generates the new first coefficient so as to reduce an error rate of the decoded transmission data.

5. The communication system according to claim 1,
wherein a receiving section of the receiving device in one of the pairs may receive a transmission signal from another pair of the pairs, and
the generation section of the receiving device generates the new first coefficient so as to reduce an effect of a received signal from the other pair of the pairs.

6. The communication system according to claim 1, wherein the expansion section of the receiving device performs
a first expansion process of sequentially expanding the received transmission signal into third elements corresponding to the components of the first domains every time interval and
a second expansion process of sequentially expanding the expanded third elements into the second elements corresponding to the components of the second domains every time interval.

7. The communication system according to claim 6, wherein
the first domain is a frequency domain, and
the first expansion process of the expansion unit of the receiving device expands the received transmission signal into the third elements by separating the signal into components of the frequency domains.

8. The communication system according to claim 7, wherein
the second domain is a time domain, and
the second expansion process of the expansion section of the receiving device expands the third elements into the second elements by sequentially delaying at each of the time intervals by the time interval.

9. The communication system according to claim 6, wherein
the first coefficient and the second element are complex numbers, and
the processing section of the receiving device performs filtering on the transmission signal to obtain processing results using:
a multiplication process of sequentially multiplying each of the second elements by a complex conjugate number of the first coefficient corresponding to each of the second elements at each of the time intervals;
a first addition process of sequentially adding all the multiplication results corresponding to the components of the second domains at each of the time intervals; and
a second addition process of sequentially adding all the first addition results at each of the time intervals.

10. The communication system according to claim 9, wherein
the third number is equal to the first number, and
the selection section of the receiving device selects the first coefficient corresponding to the components of the first number of first domains and the components of the second number of second domains from within the first coefficients as the second coefficient to generate the spread pattern.

11. The communication system according to claim 10, wherein
the second domain is a time domain,
the second expansion process of the expansion section of the receiving device expands the third elements into the second elements by sequentially delaying at each of the time intervals by the time interval, and
the selection section of the receiving device selects the first coefficient multiplied by the second number of the third elements from within the new first coefficients from the most delayed coefficient from the third elements, as the second coefficient to generate the spread pattern.

12. The communication system according to claim 10, wherein the generation unit of the receiving device generates the new first coefficient using a symbol of the transmission data determined from the processing results of the processing unit and the first coefficient.

13. The communication system according to claim 12, wherein
the first domain is a frequency domain,
the second domain is a time domain, and
the generation section of the receiving device determines a symbol of the transmission data in a complex form from the processing results of the processing section.

14. The communication system according to claim 13, wherein the generation section of the receiving device subtracts the processing result of the processing unit from the symbol of the determined transmission data, processes the subtraction result and the first coefficient by a predetermined algorithm, and generates the spread pattern.

15. The communication system according to claim 1, wherein based on the subtraction result, the generation section generates the new spread pattern in such a manner that the symbol of the determined transmission data comes close to the processing result by the processing section.

16. The communication system according to claim 15, wherein
the generation of the first coefficient by the generation unit of the receiving device is performed repeatedly,
the predetermined algorithm is implemented by:
a process of generating a first matrix where a first coefficient used at a cycle of generation of the spread pattern is associated with components of the frequency domain and components of the time domain in a matrix form;
a process of generating a second matrix where the second element is associated with the components of the frequency domain and the components of the time domain in a matrix form;
a process of calculating a norm of the generated second matrix;
a process of dividing the result of multiplying the subtraction result, the second matrix, and a predetermined coefficient by the square value of the norm; and
a process of calculating a new first coefficient by adding the division result to the first coefficient used at a cycle of generation of the spread pattern.

17. A transmitting device of a communication system including a plurality of pairs of a transmitting device and a receiving device,
wherein in each of the pairs, the transmitting device comprises:
a transmission unit which, based on a spread pattern which includes a plurality of first elements defined with respect to components of a predetermined first number of first domains and components of a predetermined second number of second domains and spreads transmission data to the components of the first domains and the components of the second domains, sequentially spreads transmission data to the components of the first domains and the components of the second domains every predetermined time interval and transmits the transmission data as a transmission signal; and
an updating unit which, based on the spread pattern received from the receiving device, updates the spread pattern used to spread the transmission data; and
wherein the receiving device is configured to:
receive a transmission signal from the transmitting device,
sequentially expand the received transmission signal into a plurality of second elements defined with respect to components of the first domains whose number is equal to or greater than the predetermined first number and components of the second domains whose number is a third number which is greater than the predetermined second number at each of the predetermined time intervals,
sequentially perform a process using a plurality of first coefficients defined for each of the second elements on the second elements obtained as a result of the expansion at each of the predetermined time intervals,
generate a new first coefficient using the processed second elements and the first coefficient,
select a second coefficient corresponding to the spread pattern from within the new first coefficients as a new spread pattern; and
transmit the new spread pattern to the transmitting device.

18. A receiving device of a communication system including a plurality of pairs of a transmitting device and a receiving device,
- wherein in each of the pairs, based on a spread pattern which includes a plurality of first elements defined with respect to components of a predetermined first number of first domains and components of a predetermined second number of second domains and spreads transmission data to the components of the first domains and the components of the second domains, the transmitting device sequentially spreads transmission data to the components of the first domains and the components of the second domains every predetermined time interval and transmits the transmission data as a transmission signal, and
- based on the spread pattern received from the receiving device, the transmitting device updates the spread pattern used to spread the transmission data,
- wherein the receiving device comprises:
- a receiving unit which receives the transmission signal;
- an expansion unit which sequentially expands the received transmission signal into a plurality of second elements defined with respect to components of the first domains whose number is equal to or greater than the predetermined first number and components of the second domains whose number is a third number which is greater than the predetermined second number at each of the predetermined time intervals;
- a processing unit which sequentially performs a process using a plurality of first coefficients defined for each of the second elements on the second elements obtained as a result of the expansion at each of the predetermined time intervals;
- a generation unit which generates a new first coefficient using the processed second elements and the first coefficient;
- selection means which selects a second coefficient corresponding to the spread pattern from within the new first coefficients as a new spread pattern; and
- a pattern transmission unit which transmits the new spread pattern to the transmitting device.

19. A communication method for a communication system including a plurality of pairs of a transmitting device and a receiving device,
- wherein in each of the pairs, based on a spread pattern which includes a plurality of first elements defined with respect to components of a predetermined first number of first domains and components of a predetermined second number of second domains and spreads transmission data to the components of the first domains and the components of the second domains, the transmission device sequentially spreads transmission data to the components of the first domains and the components of the second domains every predetermined time interval and transmits the transmission data as a transmission signal, and
- based on the spread pattern received from the receiving device, the transmission device updates the spread pattern used to spread the transmission data,
- wherein the receiving device
- receives the transmission signal,
- sequentially expands the received transmission signal into a plurality of second elements defined with respect to components of the first domains whose number is equal to or greater than the predetermined first number and components of the second domains whose number is a third number which is greater than the predetermined second number at each of the predetermined time intervals,
- sequentially performs a process using a plurality of first coefficients defined for each of the second elements on the second elements obtained as a result of the expansion at each of the predetermined time intervals,
- generates a new first coefficient using the processed second elements and the first coefficient,
- selects a second coefficient corresponding to the spread pattern from within the new first coefficients as a new spread pattern, and
- transmits the new spread pattern to the transmitting device.

20. A non-transitory computer-readable medium for a communication system including a plurality of pairs of a transmitting device having a computer and a receiving device,
- wherein the non-transitory computer-readable medium includes computer-readable instructions stored therein that, upon execution by the computer, causes the transmitting device to perform operations comprising:
- based on a spread pattern which includes a plurality of first elements defined with respect to components of a predetermined first number of first domains and components of a predetermined second number of second domains and spreads transmission data to the components of the first domains and the components of the second domains, sequentially spreading transmission data to the components of the first domains and the components of the second domains every predetermined time interval and transmitting the transmission data as a transmission signal, and
- based on the spread pattern received from the receiving device, updating the spread pattern used to spread the transmission data; and
- wherein the receiving device is configured to:
  - receive the transmission signal from the transmitting signal,
  - sequentially expands the received transmission signal into a plurality of second elements defined with respect to components of the first domains whose number is equal to or greater than the predetermined first number and components of the second domains whose number is a third number which is greater than the predetermined second number at each of the predetermined time intervals,
  - sequentially perform a process using a plurality of first coefficients defined for each of the second elements on the second elements obtained as a result of the expansion at each of the predetermined time intervals,
  - generate a new first coefficient using the processed second elements and the first coefficient,
  - select a second coefficient corresponding to the spread pattern from within the new first coefficients as a new spread pattern, and
  - transmit the new spread pattern to the transmitting device.

21. A non-transitory computer-readable medium for a communication system including a plurality of pairs of a transmitting device and a receiving device having a computer,
- wherein, based on a spread pattern which includes a plurality of first elements defined with respect to components of a predetermined first number of first domains and components of a predetermined second number of second domains and spreads transmission data to the components of the first domains and the components of the second domains, the transmitting device sequentially spreads transmission data to the components of the first domains and the components of the second domains every predetermined time interval and transmits the transmission data as a transmission signal, and based on the spread pattern received from the receiving device, the transmitting device updates the spread pattern used to spread the transmission data, wherein the non-transitory computer-readable medium includes computer-readable instructions stored therein that, upon execution by the computer, causes the receiving device to perform operations comprising:

receiving the transmission signal;

sequentially expanding the received transmission signal into a plurality of second elements defined with respect to components of the first domains whose number is equal to or greater than the predetermined first number and components of the second domains whose number is a third number which is greater than the predetermined second number at each of the predetermined time intervals;

sequentially performing a process using a plurality of first coefficients defined for each of the second elements on the second elements obtained as a result of the expansion at each of the predetermined time intervals;

generating a new first coefficient using the processed second elements and the first coefficient;

selecting a second coefficient corresponding to the spread pattern from within the new first coefficients as a new spread pattern; and transmitting the new spread pattern to the transmitting device.

* * * * *

UNITED STATES PATENT AND TRADEMARK OFFICE
CERTIFICATE OF CORRECTION

PATENT NO. : 8,102,894 B2  
APPLICATION NO. : 12/665322  
DATED : January 24, 2012  
INVENTOR(S) : Hamamura et al.

Page 1 of 2

It is certified that error appears in the above-identified patent and that said Letters Patent is hereby corrected as shown below:

In the Specification:

In Column 1, Line 41, delete "Engineers)" and insert -- Engineers). --, therefor.

In Column 1, Line 45, delete "2001)" and insert -- 2001). --, therefor.

In Column 1, Line 48, delete "1980)" and insert -- 1980). --, therefor.

In Column 11, Line 38, delete "$r_{k, m, L+\alpha}(n))$," and insert -- $r_{k, m, L+\alpha}(n)$, --, therefor.

In Column 14, Line 30, delete "$h_{k', i}$" and insert -- $h_{k, k', i}$ --, therefor.

In Column 14, Line 34, delete "$h_{k', k}$" and insert -- $I_{k', k}$ --, therefor.

In Column 15, Line 9, delete "$e^{-j2\pi\eta mt}$" and insert -- $e^{-j2\pi\xi mt}$ --, therefor.

In Column 15, Line 10, delete "$r(t)e^{-j2\pi\eta mt}$" and insert -- $r(t)e^{-j2\pi\xi mt}$ --, therefor.

In Column 15, Line 35, delete "$r_{k, 1}(n+1)$" and insert -- $r_{k, m, 1}(n+1)$ --, therefor.

In Column 20, Line 8, delete "$\gamma_k \delta$" and insert -- $y_k \varepsilon$ --, therefor.

In Column 21, Line 21, delete "$I_{k', k}-1))$." and insert -- $I_{k', k}-1)$. --, therefor.

In the Claims:

In Column 24, Line 22, in Claim 1, delete "generation unit" and insert -- generation section --, therefor.

Signed and Sealed this  
Eighth Day of October, 2013

Teresa Stanek Rea  
*Deputy Director of the United States Patent and Trademark Office*

CERTIFICATE OF CORRECTION (continued)
U.S. Pat. No. 8,102,894 B2

In Column 24, Line 28, in Claim 1, delete "transmission unit" and insert -- transmission section --, therefor.

In Column 24, Lines 34-35, in Claim 3, delete "generation unit" and insert -- generation section --, therefor.

In Column 24, Lines 39-40, in Claim 4, delete "decoding unit" and insert -- decoding section --, therefor.

In Column 24, Line 42, in Claim 4, delete "generation unit" and insert -- generation section --, therefor.

In Column 24, Line 66, in Claim 7, delete "expansion unit" and insert -- expansion section --, therefor.

In Column 25, Line 48, in Claim 12, delete "generation unit" and insert -- generation section --, therefor.

In Column 25, Line 61, in Claim 14, delete "processing unit" and insert -- processing section --, therefor.

In Column 26, Line 5, in Claim 16, delete "generation unit" and insert -- generation section --, therefor.

In Column 26, Line 30, in Claim 17, delete "transmission unit" and insert -- transmission section --, therefor.

In Column 26, Line 43, in Claim 17, delete "updating unit" and insert -- updating section --, therefor.

In Column 27, Line 21, in Claim 18, delete "receiving unit" and insert -- receiving section --, therefor.

In Column 27, Line 22, in Claim 18, delete "expansion unit" and insert -- expansion section --, therefor.

In Column 27, Line 30, in Claim 18, delete "processing unit" and insert -- processing section --, therefor.

In Column 27, Line 35, in Claim 18, delete "generation unit" and insert -- generation section --, therefor.

In Column 27, Line 41, in Claim 18, delete "transmission unit" and insert -- transmission section --, therefor.